(12) United States Patent
Kwong et al.

(10) Patent No.: US 7,653,091 B2
(45) Date of Patent: Jan. 26, 2010

(54) APPARATUS FOR SYNCHRONIZATION OF DIGITAL MULTIMEDIA DATA COMMUNICATED OVER WIRED MEDIA

(75) Inventors: Sze Ming Patrick Kwong, Fanling (HK); Man Lung Alan Lam, Tai Po (HK); Tun Oo George Maung, Kowloon (HK)

(73) Assignee: RadioShack Corporation, Fort Worth, TX (US)

( * ) Notice: Subject to any disclaimer, the term of this patent is extended or adjusted under 35 U.S.C. 154(b) by 644 days.

(21) Appl. No.: 11/171,557

(22) Filed: Jun. 30, 2005

(65) Prior Publication Data

US 2006/0256822 A1    Nov. 16, 2006

Related U.S. Application Data

(63) Continuation-in-part of application No. 11/127,379, filed on May 12, 2005.

(51) Int. Cl.
*H04J 3/06* (2006.01)
(52) U.S. Cl. ...................................... 370/503
(58) Field of Classification Search ................ 370/389, 370/390, 394, 503, 510, 512; 725/38, 105, 725/106, 109, 110, 111
See application file for complete search history.

(56) References Cited

U.S. PATENT DOCUMENTS

| | | | | |
|---|---|---|---|---|
| 4,774,496 A | 9/1988 | Tomasevich | ................. | 341/50 |
| 5,216,675 A | 6/1993 | Melliar-Smith et al. | ....... | 371/32 |
| 5,245,616 A | 9/1993 | Olson | ........................ | 371/32 |
| 5,892,795 A * | 4/1999 | Paret | .......................... | 375/222 |
| 5,898,695 A * | 4/1999 | Fujii et al. | .................. | 370/464 |
| 6,594,052 B2 * | 7/2003 | Hiramatsu et al. | .......... | 398/140 |
| 6,996,327 B1 * | 2/2006 | Park et al. | ..................... | 386/95 |
| 2002/0154602 A1 * | 10/2002 | Garcia-Luna-Aceves et al. | ............... | 370/230 |
| 2003/0067872 A1 * | 4/2003 | Harrell et al. | ............... | 370/229 |
| 2003/0133462 A1 * | 7/2003 | Schoenblum | .......... | 370/395.64 |
| 2003/0172132 A1 | 9/2003 | Lin et al. | ..................... | 709/219 |
| 2005/0166135 A1 * | 7/2005 | Burke et al. | ............. | 715/500.1 |
| 2006/0007947 A1 | 1/2006 | Li et al. | ...................... | 370/432 |

* cited by examiner

*Primary Examiner*—Hanh Nguyen
*Assistant Examiner*—Juvena Loo
(74) *Attorney, Agent, or Firm*—Whitaker, Chalk, Swindle & Sawyer, LLP; Stephen S. Mosher

(57) ABSTRACT

An apparatus for synchronizing the initiation of the playback of packetized multimedia data received asynchronously in each receiver in a system, and for synchronizing the real time playback in a plurality of receivers in the system, from the transmitter over a wired communications medium. The clocks in the transmitter encoder and the receiver decoders operate asynchronously but at substantially the same rate. Initiation of playback is synchronized according to the arrival time of a first received data packet having a zero-valued retransmit number. Real time playback among a plurality of receivers is synchronized according to a measured time difference between an operating rate of the encoder and an operating rate of the decoder.

16 Claims, 13 Drawing Sheets

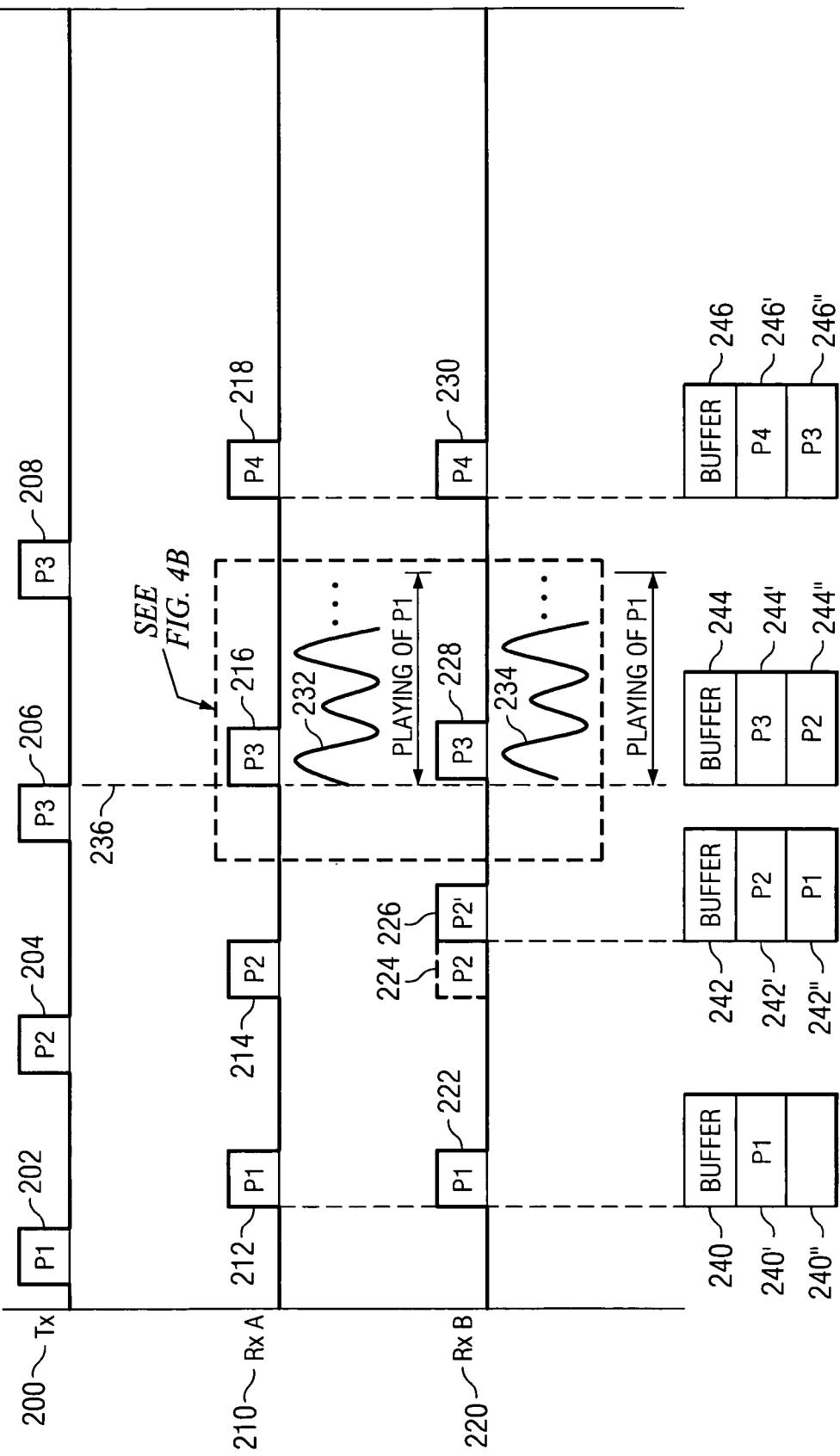

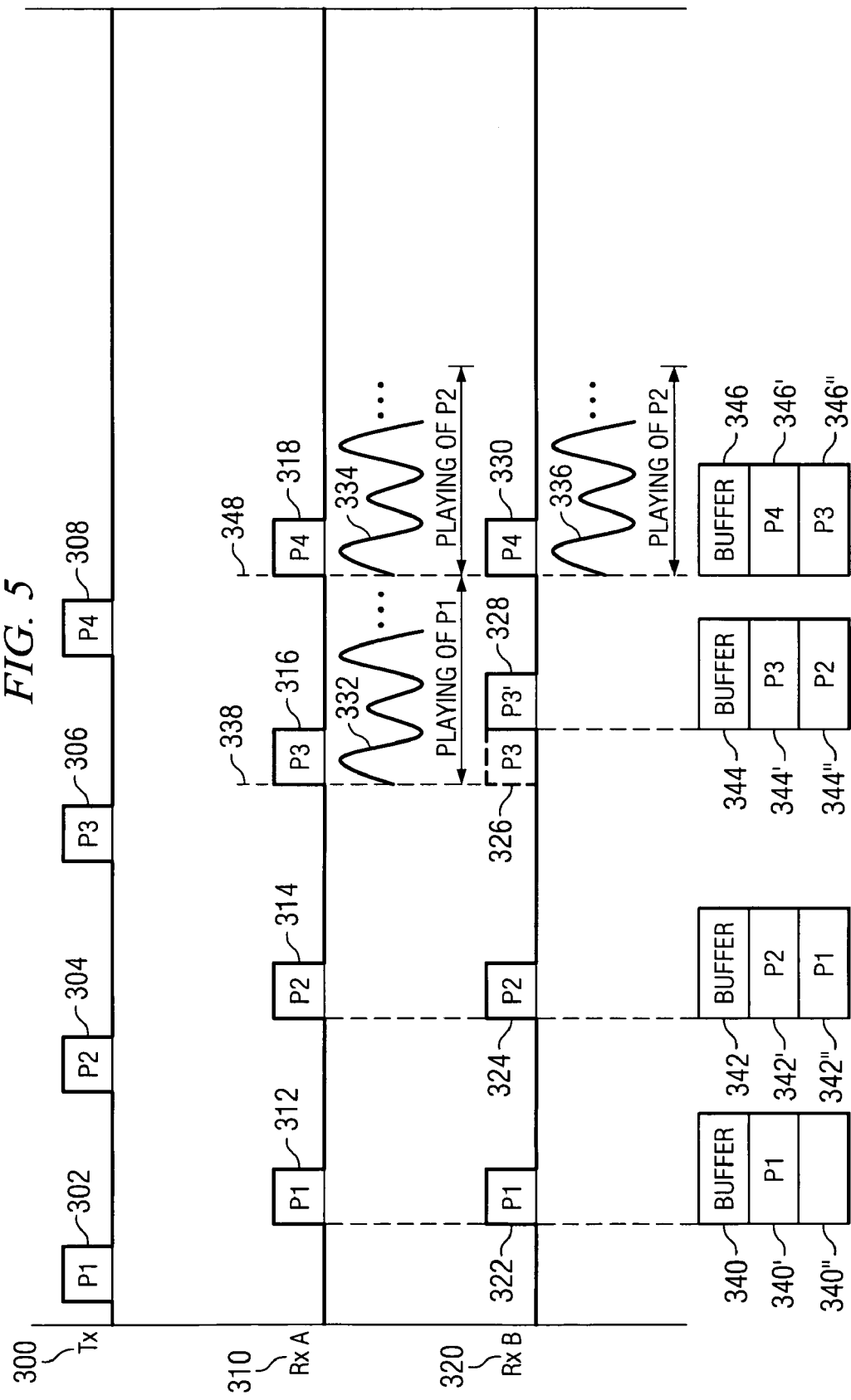

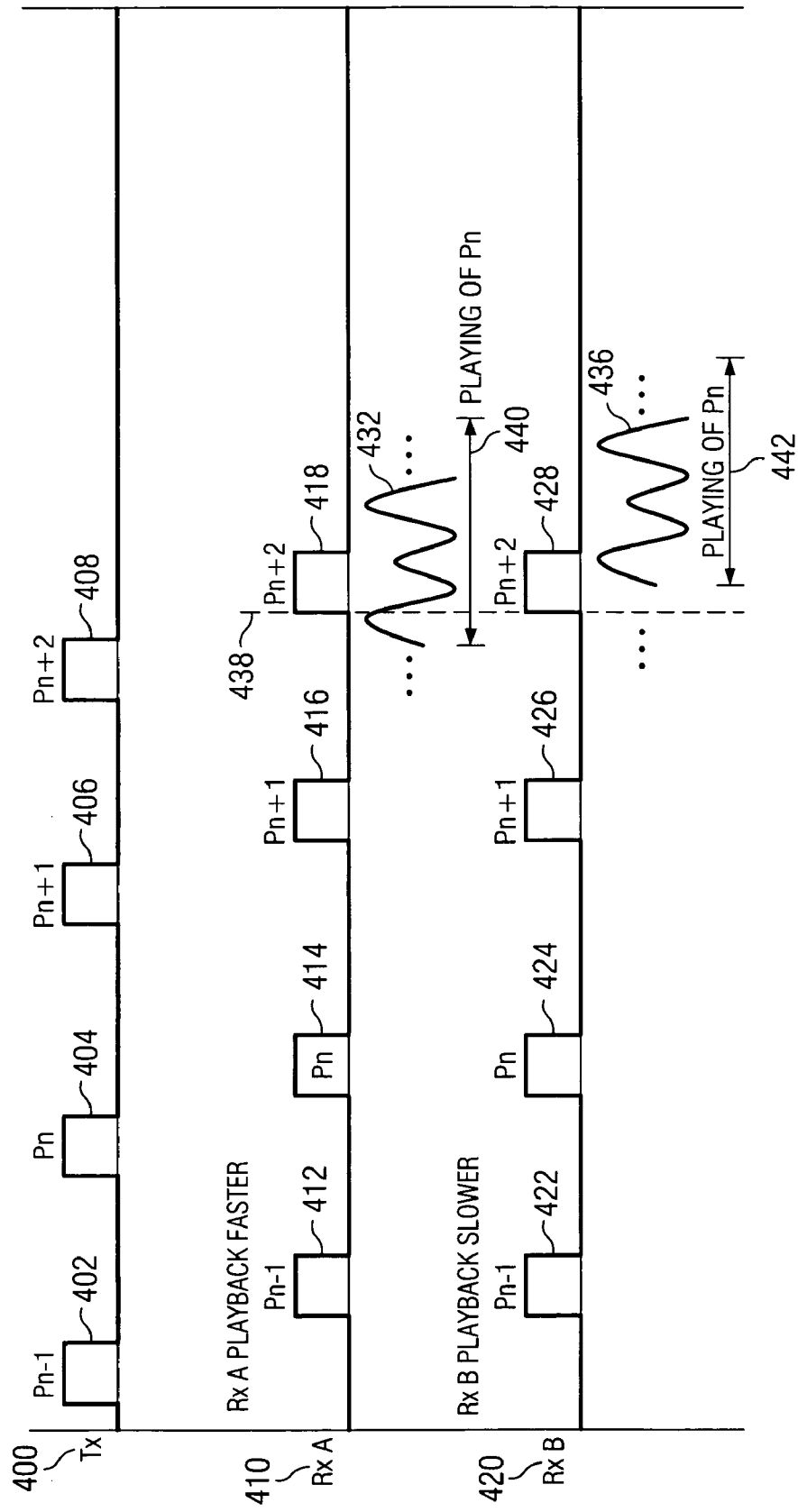

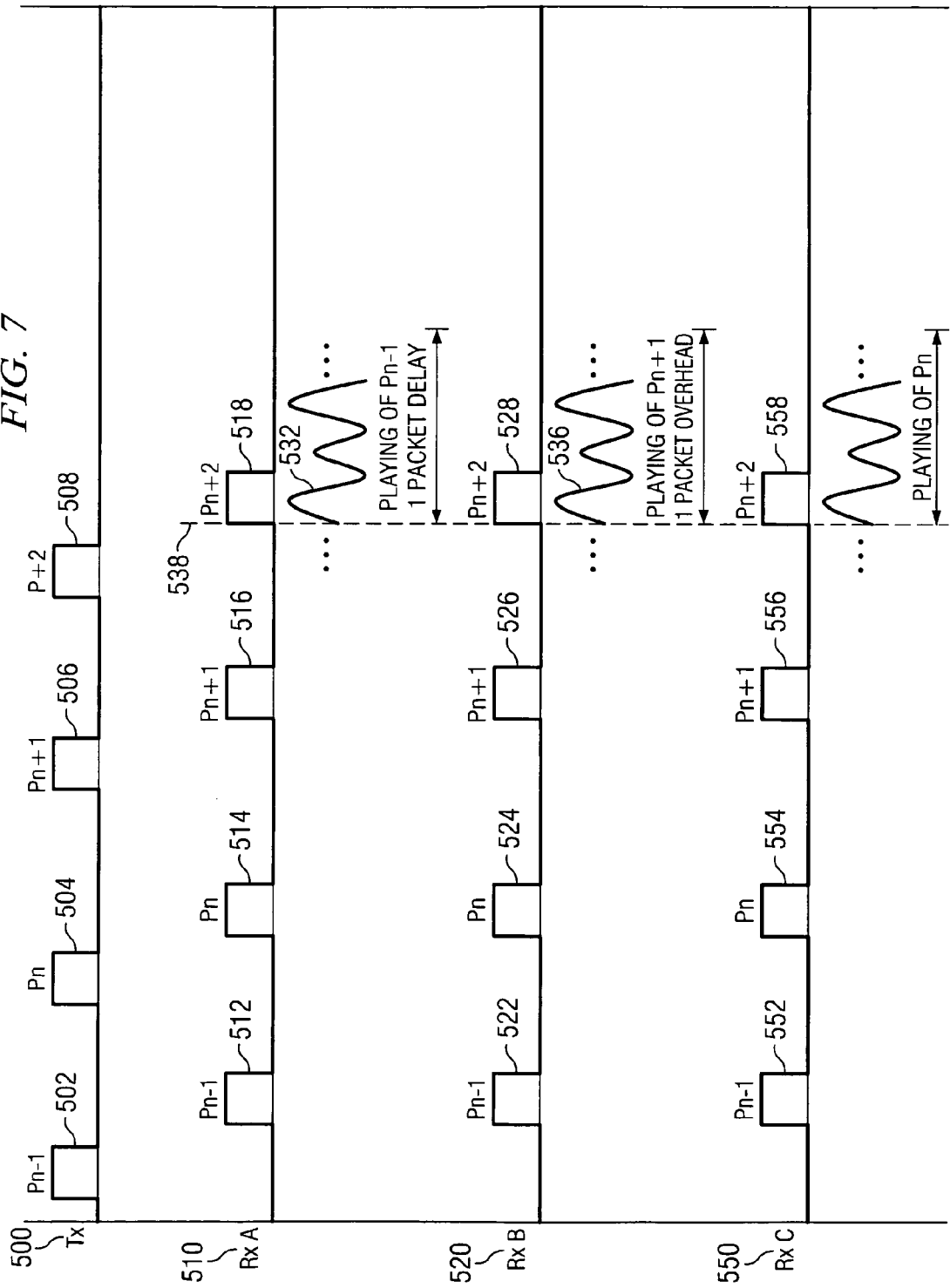

APPARATUS FOR SYNCHRONIZATION OF DIGITAL MULTIMEDIA DATA COMMUNICATED OVER WIRED MEDIA

The present patent application is a Continuation-In-Part of U.S. patent application Ser. No. 11/127,379, filed May 12, 2005, entitled "Method and Apparatus for Synchronization of Digital Multimedia Packets."

BACKGROUND OF THE INVENTION

1. Field of the Invention

The present invention generally relates to multimedia data communication and, more particularly, to a method and apparatus for synchronizing packetized multimedia data in and among a plurality of receivers adapted for use on a wideband, wired communications medium.

2. Description of the Prior Art

Multimedia data includes audio, video, and video plus audio data, which may be delivered by wired or wireless communication devices and methods. Examples of wired communication include Ethernet, other high speed networks such as HomePlug®, or other power line network systems. Wireless communication examples generally include RF or infrared data links. Regardless of the type of medium, multimedia signals are typically converted to digitized form for transmission because of the advantages in efficiency and spectrum utilization over the traditional analog forms of modulation and transmission.

In a conventional digital system, an original analog signal is sampled by an analog-to-digital (ADC) converter to produce discrete digital data which may be processed in a variety of ways and compressed to reduce its bandwidth and improve the transmission rate required. In such systems the data may be grouped into data packets of a predetermined size and content (packetization) before being transmitted through the selected medium. Data packets may be transmitted point-to-point, or point-to-multipoint including broadcast mode (to all receivers) or multicast mode (to a specified range of receivers). Of all the receivers in the transmission medium set to receive signals produced by the transmitter in the medium, only those receivers having the address included in the packet header will be able to receive the data packets addressed to them and to obtain the data contained therein. The packets also contain information, such as a CRC checksum, to verify the received data. Operations are carried out in the receiver to decompress and reassemble the data, and convert it back to analog form for playback. The data packets are generally transmitted at constant intervals depending on the sampling rate, compression ratio, packet size, etc. Ideally, the packets arrive periodically and "in step" at the receiver for reconstruction as a continuous stream of video or audio.

However, in the real world, with normal transmission media, the loss or corruption of data packets is inevitable because of the effects of noise and interference. As is well known, electrical power lines provide a medium subject to wide variations in transmission conditions, including high levels of noise and interference. It is then necessary to retransmit lost packets, which delays the arrival of the packet at the receiver, or skip the lost packets, which results in gaps in the perceived playback. Further, when the transmitter and each of the receivers operate independently of each other in time, encoding and decoding the data at their own clock rate, processing operations occur asynchronously. Individual time differences may accumulate, resulting in noticeable artifacts such as echoes, garbled or lost data, or unintended noise, sounds or blemishes during playback. In several important examples, if the transmitter encodes data faster than the receiver decodes the data, the packets are generated at a higher rate than they are consumed. Periodically, the excess packets may accumulate and be discarded, resulting in a loss of some of the data. Similarly, if the transmitter encodes data slower than the receiver decodes the data, the packets are generated at a lower rate than they are consumed. Upon playback, the continuity of the data may be subject to being interrupted intermittently, resulting in gaps in the sound or video image. Moreover, in the case of distribution of multimedia data from one source to multiple receivers, echoes may occur in the playback of data from receivers that are not playing the data at the same pace, producing unacceptable artifacts or omissions. These problems may be especially troublesome when the receivers are within audible or visual proximity of each other.

Several methods have been proposed and are in use to provide for synchronizing the signals received by a plurality of receivers to correct for these deficiencies. For example, in conventional systems, extra data packets, called "start" packets may be transmitted periodically along with the packetized data to provide a time reference for the receiver to maintain the operation of its decoder at the same rate as the encoder in the transmitter. Alternatively, the transmitter may broadcast a replica of its clock signal to all receivers to provide a synchronizing signal for all of the receivers to "lock on" to the same clock that controls the encoder. Both of these methods, while effective, consume valuable bandwidth, an important resource in a wideband multimedia signal. Further, such synchronization methods can result in unintended collision events.

Succinctly stated, the problem presented by the prior art is how to synchronize a plurality of receivers receiving a multimedia signal when several receivers are within audible or visual proximity to each other, and how to keep the playback of the multimedia program at each receiver location synchronized with the transmitter, without the use of additional clock signals, which consume bandwidth and/or result in increased collision events. What is needed is a method of synchronizing multimedia signals in the receivers in a simpler, more efficient way when transmitted by a single transmitter.

SUMMARY OF THE INVENTION

Accordingly, a method of synchronizing the initiation of playback of packetized multimedia data received asynchronously from a transmitter is provided comprising the steps of: providing an encoder in the transmitter and a timer and a decoder in each receiver; defining each data packet for transmission over a medium to include at least a packet sequence number and a packet retransmit number; acknowledging receipt of a valid received data packet and a correct packet sequence number associated therewith; determining whether a reserve buffer in the receiver is full; and synchronizing the initiation of playback of the multimedia data in each receiver according to the arrival time of the first received data packet having a zero-valued retransmit number.

In another aspect, a method of synchronizing the real time playback of packetized multimedia data received asynchronously in one or more receivers from a transmitter is provided comprising the steps of: providing an encoder in the transmitter and a timer and a decoder in each receiver; defining each data packet for transmission over a medium to include at least a packet sequence number and a packet retransmit number; acknowledging receipt of a valid received data packet and a correct packet sequence number associated therewith; determining whether a reserve buffer in the receiver is full;

and synchronizing the rate of playback of the multimedia data in each receiver according to the measured time difference between the operating rate of the encoder in the transmitter and the operating rate of the decoder in each receiver.

In yet another aspect, a method of synchronizing the real time playback of packetized multimedia data received asynchronously in one or more receivers from a transmitter is provided comprising the steps of: providing an encoder in the transmitter and a timer and a decoder in each receiver; defining each data packet for transmission over a medium to include at least a packet sequence number and a packet retransmit number; acknowledging receipt of a valid received data packet and a correct packet sequence number associated therewith; determining whether a reserve buffer in the receiver is full; synchronizing the initiation of playback of the multimedia data in each receiver according to the arrival time of the first received data packet having a zero-valued retransmit number; and synchronizing the rate of playback of the multimedia data in each receiver according to a measured time difference between the operating rate of the encoder in the transmitter and the operating rate of the decoder in each receiver.

In yet another aspect an apparatus for synchronizing the initiation of playback of packetized multimedia data received asynchronously from a transmitter is provided comprising: a data packet defined for transmission over a medium and having at least a packet sequence number and a packet transmit number; a receiver having a timer and a decoder, wherein the decoder operates at a clock rate that is the same as the clock rate of an encoder in the transmitter but independent therefrom; means for acknowledging, at each receiver after transmission of a data packet, receipt of a valid received data packet and a correct packet sequence number associated therewith; and means for synchronizing the initiation of playback of the multimedia data in each receiver according to the arrival time of a first received data packet having a zero-valued retransmit number.

In yet another aspect, an apparatus for synchronizing real time playback of packetized multimedia data received asynchronously in one or more receivers from a transmitter is provided comprising: a data packet defined for transmission over a medium and having at least a packet sequence number and a packet transmit number; a receiver having a timer and a decoder, wherein the decoder operates at a clock rate that is the same as the clock rate of an encoder in the transmitter but independent therefrom; means for acknowledging, at each receiver after transmission of a data packet, receipt of a valid received data packet and a correct packet sequence number associated therewith; means for synchronizing the rate of playback of the multimedia data in each receiver according to a measured time difference between an operating rate of the encoder and an operating rate of the decoder.

In yet another aspect an apparatus is disclosed for synchronizing the initiation of playback of packetized multimedia data received asynchronously from a transmitter over a wired communications medium, comprising: a receiver having an interface for use with a wired communication medium and having a timer and a decoder, wherein the decoder operates at a clock rate that is substantially the same as the clock rate of an encoder in the transmitter but independent therefrom; means for acknowledging, at each receiver after transmission of a data packet having at least a packet sequence number and a packet transmit number associated with the data packet, receipt of a valid received data packet and a correct packet sequence number associated therewith; and means for synchronizing the initiation of playback of the multimedia data in each receiver according to the arrival time of a first received data packet having a zero-valued retransmit number.

In yet another aspect, an apparatus is disclosed for synchronizing real time playback of packetized multimedia data received asynchronously in one or more receivers from a transmitter via a wired communications medium, comprising: a receiver having an interface for use with a wired communication medium and having a timer and a decoder, wherein the decoder operates at a clock rate that is substantially the same as the clock rate of an encoder in the transmitter but independent therefrom; means for acknowledging, at each receiver after transmission of a data packet having at least a packet sequence number and a packet transmit number associated with the data packet, receipt of a valid received data packet and a correct packet sequence number associated therewith; and means for synchronizing the rate of playback of the multimedia data in each receiver according to a measured time difference between an operating rate of the encoder and an operating rate of the decoder.

BRIEF DESCRIPTION OF THE DRAWINGS

FIG. 4A illustrates a first example of multimedia data packets being transmitted, received by first and second receivers and temporarily buffered, wherein a second data packet to the second receiver is re-transmitted, and further illustrates the beginning of playback of decompressed data in each receiver;

FIG. 5 illustrates a second example of multimedia data packets being transmitted, received by first and second receivers and temporarily buffered, wherein a third data packet to the second receiver is re-transmitted, and further illustrates the beginning of playback of decompressed data in each receiver;

FIG. 6 illustrates first and second receivers receiving the same multimedia data signal but playing back the received data asynchronously;

FIG. 7 illustrates first, second, and third receivers receiving the same multimedia data signal and playing the data synchronously except that the first and second receivers are playing the wrong data packet;

DETAILED DESCRIPTION OF THE INVENTION

Figure 1A:
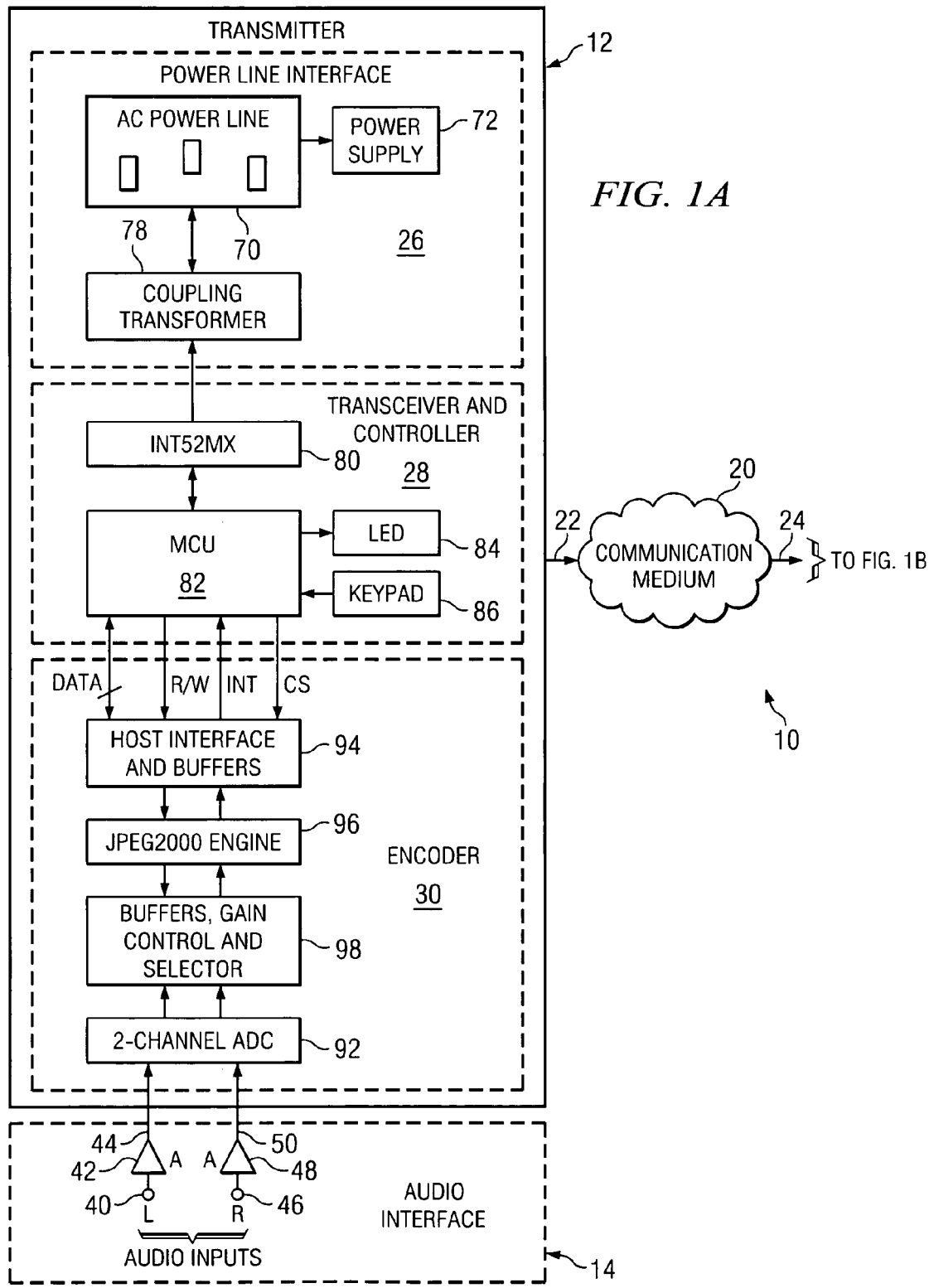
FIG. 1A illustrates a first transmitter portion of a system block diagram according to one embodiment of the present invention.
Figure 1B:
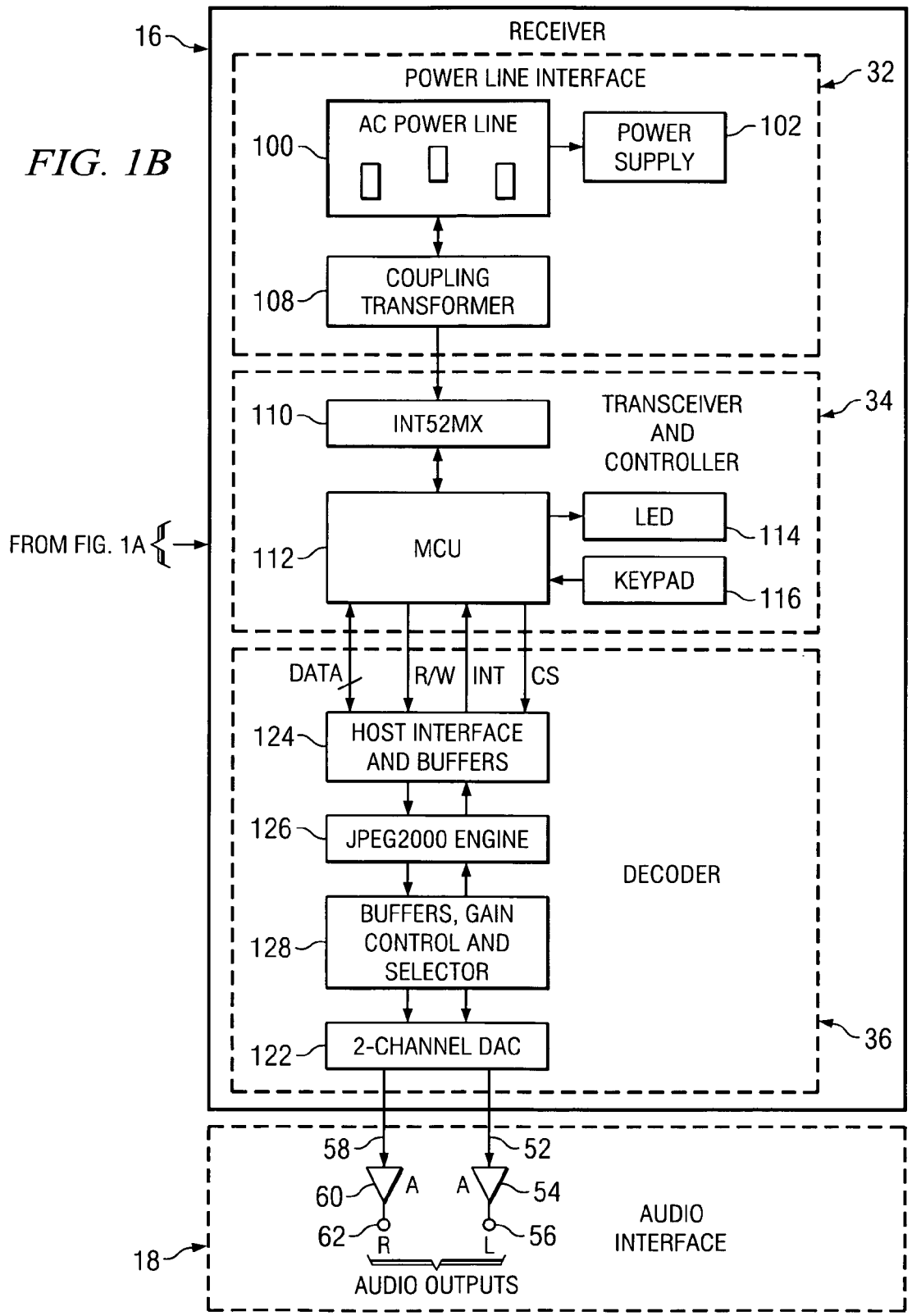
FIG. 1B illustrates a second receiver portion of a system block diagram according to the embodiment of FIG. 1A of the present invention.

Referring to FIGS. 1A and 1B, which will be described together as though it were shown on a single sheet, there is illustrated a system block diagram of one embodiment of the present invention. FIG. 1A illustrates one embodiment of a transmitter portion of the system and FIG. 1B illustrates one embodiment of a receiver portion of the system. In the following description, the multimedia signal(s) that will be referred to could typically be an audio signal or a video signal or a composite video/audio signal. Moreover, the synchronization methods described herein are not limited to audio and/or video signals but could be any type of analog multimedia signal. For purposes of illustration, the embodiment shown is configured to process a two channel stereo audio signal.

The system 10 includes a transmitter 12, an audio input interface 14 coupled to the transmitter 12, a receiver 16, and an output audio interface 18 coupled to the receiver 16. The transmitter 12 is coupled to the receiver 16 via a communications medium 20 through a transmit path 22 and a receive path 24. In the illustrative embodiment described herein, represented by the system 10 of FIGS. 1A and 1B, the communications medium 20 is an AC power line network that exists in residences, businesses, etc. Thus, the transmit path 22 is the part of the power line coupled to the transmit end of the communications link through the communications medium 20, and the receive path 24 is the part of the power line coupled to the receive end of the communications link through the communications medium 20. However, the invention disclosed herein is not limited to the AC power line as the communications medium 20. in fact, it is contemplated that any communications medium, wired or wireless, radio frequency (RF) or optical, or any combination thereof including a global or other communication network such as the Internet, that is capable of high speed communications of packetized multimedia data is equally well suited to employing the teachings of the present invention disclosed herein. The transmitter 12 includes three principle sections, a power line interface 26, a transceiver/controller 28, and an encoder 30. Similarly, the receiver 16 includes three principle sections, a power line interface 32, a transceiver/controller 34, and a decoder 36. The power line interfaces 26, 32 respectively connect the transmitter 12 to the transmit path 22 and the receiver 16 to the receive path 24. It will be appreciated that the configuration of the various principle sections of the transmitter 12 and the receiver 16, as identified above, will be determined by the characteristics of the communications medium 20 that is selected for the specific implementation desired.

Continuing with FIGS. 1A and 1B, the audio input interface 14 includes a left (L) channel input 40 coupled to a left channel audio amplifier 42 having an output coupled via line 44 to a first input of analog-to-digital controller (ADC) 92 in the encoder 30. The audio input interface 14 further includes a right (R) channel input 46 coupled to a left channel audio amplifier 48 having an output coupled via line 50 to a second input of analog-to-digital controller (ADC) 92 in the encoder 30. Connected to first and second outputs of a digital-to-analog controller (DAC) 122 in the decoder 36 are a left channel node 52 and a right channel node 58. The audio output interface 18 includes the left channel node 52 coupled to an input of a left channel audio power amplifier 54 having a left channel output 56. The left channel output 56 may be provided by a connector such as a receptacle or jack (not shown). The audio output interface 18 includes the right channel node 58 coupled to an input of a right channel audio power amplifier 60 having a right channel output 62. The right channel output 62 may be provided by a connector such as a receptacle or jack (not shown).

In the illustrative embodiment, left and right audio power amplifiers 54, 60 are shown for driving loudspeakers (not shown) to reproduce the original sounds represented by the audio signals. In other embodiments, the audio power amplifiers 54, 60 may be replaced by audio line amplifiers for driving other equipment in a system for recording, or distributing the audio signals to various locations for playback, such as background music, distribution of program to several listening or viewing areas, and the like. The type of amplifiers or other interface components selected would be determined by the particular application and in no way affect the synchronization methods disclosed herein.

Continuing with the transmitter 12 of the system 10 of FIG. 1A, the power line interface 26 includes an AC power line connector plug 70 coupled to a power supply 72 and a first winding of a coupling transformer 78. The power supply 72 provides operating voltages for the circuitry of the transmitter 12. The coupling transformer provides the high frequency coupling for data packet signals between the transceiver/controller 28 and the AC power line connected to the connector plug 70. A second winding of the coupling transformer 78 is coupled to an output of a transceiver 80 in the transceiver/controller 28. The transceiver 80 is further coupled to and interacts with a microcontroller 82. The microcontroller 82 is provided for controlling the operation of the transceiver 80 and the encoder 90, to be described. Further coupled to the microcontroller 82 is an LED indicator 84 and a keypad 86. The LED indicator 84 may include one or more LEDs depending upon the number of parameters or functions to be indicated. For example, a first LED could be included to indicate the status of the communication channel or link, i.e., busy or open, and a second LED may be used as a traffic indicator. In other embodiments a single LED may indicate more than one parameter or function according to the form of signal received by the LED indicator 84. The key pad 86, in one illustrative embodiment, may include different numbers of individual keys, depending on the kinds of command inputs needed to operate and control the particular implementation. For example, in one embodiment, four keys for respectively inputting commands such as channel, volume UP, volume DOWN, power ON/OFF, etc. may be provided.

Coupled with the microcontroller 82 (also called the MCU 82) may be a plurality of data and/or control lines between the microcontroller 82 and the encoder 30. For example, in FIG. 1A, the host interface and buffers 94 is coupled to the MCU 82 via data, Read/Write (R/W), Interrupt, and Chip Select (CS) lines. The encoder 30 may be duplicated to include one or more separate encoder sections corresponding respectively to one or more separate multimedia sources. Each encoder 30 includes its own set of data and control lines. The encoder 30 processes signals output from the ADC 92, which may be part of an encoder module or may be a separate, external ADC in the case where particular performance levels are to be provided. The encoder 30 includes three main sections, in order identified as the host interface and buffers 94, to which the data and control lines to and from the microcontroller 82 are connected, a JPEG2000 encoder 96, and a section containing buffers, gain control and selector elements 98 for controlling the data signals input from the audio interface 14. The JPEG2000 encoder provides for compressing the digitized multimedia or audio data to reduce the bandwidth required for transmission, and formatting the data into packetized form for transmission to provide efficient transmission and improve the immunity of the data from loss or corruption due to noise, interference, and other transmission channel irregularities.

The major sections of the transmitter 12 shown in FIG. 1A, which may conveniently be implemented using off-the-shelf integrated circuits (ICs), include an INT5200 series transceiver (80) IC manufactured by Intellon Corporation, Ocala, Fla. 34482, an EZ80 microcontroller (82), available from many manufacturers, an ET83X431 Real-Time CODEC encoder (30) manufactured by Etoms Electronics Corporation of Hsin-Chu City, Taiwan, R.O.C., and a standard two-channel, 16 bit ADC (92) IC available from many manufacturers. In some applications, the built-in ADC of the CODEC encoder may be suitable. However, for high quality audio, a 16 bit ADC is recommended. The INT5200 series transceiver 80, which is operated in the PHY mode and connects to the microcontroller 82 via the PHY interface in the illustrated embodiment, is especially adapted for data communications via the AC power line in compliance with the HomePlug® 1.0 industry standard specification.

The JPEG2000 engine in the ET83X431 CODEC employs the discrete wavelet transform (DWT) process in providing the necessary compression while maintaining high quality streaming audio. The DWT provides a practical method of representing a non-stationary signal, wherein it is required to represent both the frequency of individual spectral components and the instant of time at which each component occurs. The DWT takes advantage of the fact that low frequency components are best resolved in terms of frequency and the higher frequencies are best resolved in terms of time. Readers may find the following paper of interest: "Audio Analysis using the Discrete Wavelet Transform," by George Tzanetakis, Georg Essl, and Perry Cook, In. Proc. WSES Int. Conf. on Acoustics and Music: Theory and Applications (AMTA 2001) Skiathos, Greece 2001, and available at www.cs.princeton.edu/~gtzan/publications. In configuring the ET83X431 Real Time CODEC, several parameters of the encoder 30 are set as follows to provide the required performance. The sampling rate is set to 44.1 KHz, the audio compression set to "high quality," the gain control is set to zero (0) dB, and the appropriate registers are set for the "stereo music playing mode," according to the data sheet for the ET83X431, available on line at www.etomscorp.com. Other registers are given predetermined values suggested by the data sheet information as will be readily apparent to persons skilled in the art.

Continuing with the receiver 16 of the system 10 of FIG. 1B, the power line interface 32 includes an AC power line connector plug 100 coupled to a power supply 102 and a first winding of a coupling transformer 108. The power supply 102 provides operating voltages for the circuitry of the receiver 102. The coupling transformer 108 provides the high frequency coupling for data packet signals between the transceiver/controller 34 and the AC power line connected to the connector plug 100. A second winding of the coupling transformer 108 is coupled from an input of a transceiver 110 in the transceiver/controller 34. The transceiver 110 is further coupled to and interacts with a microcontroller 112 (also called the MCU 112 herein below). The microcontroller 112 is provided for controlling the operation of the transceiver 110 and the decoder 120, to be described. Further coupled to the microcontroller 112 is an LED indicator 114 and a keypad 116. The LED indicator 114 may include one or more LEDs depending upon the number of parameters or functions to be indicated. For example, a first LED could be included to indicate the status of the communication channel or link, i.e., busy or open, and a second LED may be used as a traffic indicator. In other embodiments a single LED may indicate more than one parameter or function according to the form of signal used to activate the LED indicator 114. The key pad 16, in one illustrative embodiment, may include different numbers of individual keys, depending on the kinds of command inputs needed to operate and control the particular implementation. For example, in one embodiment, four keys for respectively inputting commands such as channel, volume UP, volume DOWN, power ON/OFF, etc. may be provided.

Coupled with the microcontroller 112 may be a plurality of data and/or control lines between the microcontroller 112 and the decoder 36. For example, in FIG. 1B, the host interface and buffers 124 is coupled to the MCU 112 via data, Read/Write (R/W), Interrupt, and Chip Select (CS) lines. The decoder 36 includes its own set of data and control lines. The decoder 36 processes signals output from the microcontroller 112 in three main sections, in order identified as the host interface and buffers 124, to which the data and control lines to and from the microcontroller 112 are connected, a JPEG2000 decoder 126, and a section containing buffers, gain control and selector elements 128 for controlling the data signals output to the audio output interface 18. The JPEG2000 decoder provides for decompressing the digitized multimedia or audio data before being sent to the two-channel digital-to-analog controller (DAC) 122 for conversion to baseband audio signals for each left and right channel. In the illustrative embodiment, the DAC 122 may be an external 16 bit unit for high quality audio. Alternatively, for less stringent requirements, the 10 bit DAC built into the ET83X431 CODEC may be used. Following conversion, which includes low pass filtering to remove high frequency and sampling frequency components, the left and right audio signals are coupled to the audio output interface 18 to be amplified and coupled to the playback devices such as the left and right loudspeakers (not shown) or as line outputs to other devices for recording or playback. The audio output interface 18 may include left 52 and right 58 audio input lines respectively coupled to the inputs of audio power amplifiers 54 (left) and 60 (right) for driving loudspeakers via terminals 56 (left) and 62 (right). Alternatively, the amplifiers 54, 60 may be configured for providing line output signals to a recording or signal distribution device.

The major sections of the receiver 16 shown in FIG. 1B, which may conveniently be implemented using off-the-shelf integrated circuits (ICs), include an INT5200 series transceiver (110) IC manufactured by Intellon Corporation, Ocala, Fla. 34482, an EZ80 microcontroller (112), available from many manufacturers, an ET83X431 Real-Time CODEC decoder (36) manufactured by Etoms Electronics Corporation of Hsin-Chu City, Taiwan, R.O.C., and a standard two-channel, 16 bit ADC (122) IC available from many manufacturers. In some applications, the built-in ADC of the CODEC encoder (36) may be suitable. However, for high quality audio, a 16 bit ADC is recommended. The INT5200 series transceiver 110, which is operated in the PHY mode and connects to the microcontroller 112 via the PHY interface in the illustrated embodiment, is especially adapted for data communications via the AC power line in compliance with the HomePlug® 1.0 industry standard specification.

The JPEG2000 engine in the ET83X431 CODEC employs the discrete wavelet transform (DWT) process in providing the necessary decompression while maintaining high quality streaming audio. As mentioned herein above, the DWT provides a practical method of representing a non-stationary signal, wherein it is required to represent both the frequency of individual spectral components and the instant of time at which each component occurs. In configuring the ET83X431 Real Time CODEC, several parameters of the decoder 36 are set as follows to provide the required performance. The sampling rate is set to 44.1 KHz, the audio decompression set to "high quality," the gain control is set to zero (0) dB, the low pass filters are set to the default values according to the manufacturer's recommendation, and the appropriate registers are set for the "stereo music playing mode," according to the data sheet for the ET83X431. Other registers are given predetermined values suggested by the data sheet information as will be readily apparent to persons skilled in the art. In the illustrative example, the clocks of the encoder 30 in the transmitter 12 and the decoder 36 in the receiver 16 are operated on the same frequency, 12.288 MHz, within a tolerance of 100 ppm. This specification is a requirement of the synchronization method as applied to the illustrative example to be described herein.

Figure 2:
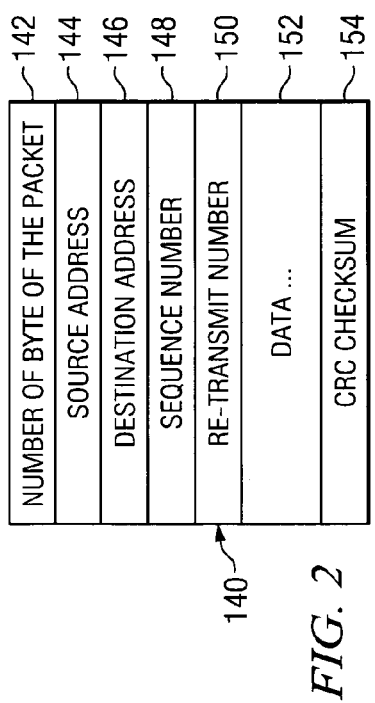
FIG. 2 illustrates one embodiment of a multimedia data packet according to the embodiment of the present invention.

Referring to FIG. 2, there is illustrated one embodiment of a multimedia data packet according to the present invention. Shown in order from top to bottom in the figure are the principle elements of the data packet as it appears following the encoding process in the transmitter, which will be explained further herein below. After the input analog signal is processed through the audio interface 14, the ADC 92, and the encoder 30 of FIG. 1A, the data packet 140 has the content shown in FIG. 2 before compression has been performed in the JPEG2000 encoder 96. A first block 142 contains the number of bytes of the packet, followed by one block each for the source address 144 and the destination address 146. In the next two blocks, a sequence number 148 and a retransmit number 150 are defined, respectively. The balance of the data packet 140 is reserved for the data payload 152 followed by the checksum data 154.

Continuing with FIG. 2, the sequence number 148, which functions as a packet identifier or packet ID, is generated in the transmitter and represents a serial number of each one of a succession of data packets 140 that make up a complete transmission of packetized multimedia data. For multimedia data, such succession of data packets may extend continuously for long periods of time. The sequence number provides a way for the receiver to verify that a data packet 140 just received is the correct next data packet to be processed in the receiver and to acknowledge that fact to the transmitter, as will be explained. The sequence number 148, as the packet ID, also plays an important role in the synchronization method to be described herein below in conjunction with FIGS. 8, 9, and 10.

The re-transmit number 150, which may also be called a re-transmit flag 150 herein, is a number assigned by the transmitter to a data packet if a timely acknowledgment is not received from the receiver after transmitting the data packet. The re-transmit number 150 also plays an important role in the synchronization method described herein. When a data packet is initially configured, it is assigned a re-transmit number 150 of zero (0). The first time a data packet 140 must be transmitted again, or re-transmitted, the re-transmit number is assigned a value of 1. The second time a data packet 140 must be re-transmitted again, it is assigned a re-transmit number of 2. Data packets 140 that need further re-transmission will not be transmitted again because they will be rejected by the receiver, as will become clear herein below. The sequence number 148 and the re-transmit number 150 are essential data used by the receiver during the process of maintaining synchronization (a) of each of a plurality of receivers that receive packetized multimedia data from a single transmitter, and (b) of the decoder in each receiver with the encoder in the transmitter in the synchronization process to be described in detail infra.

Figure 3:
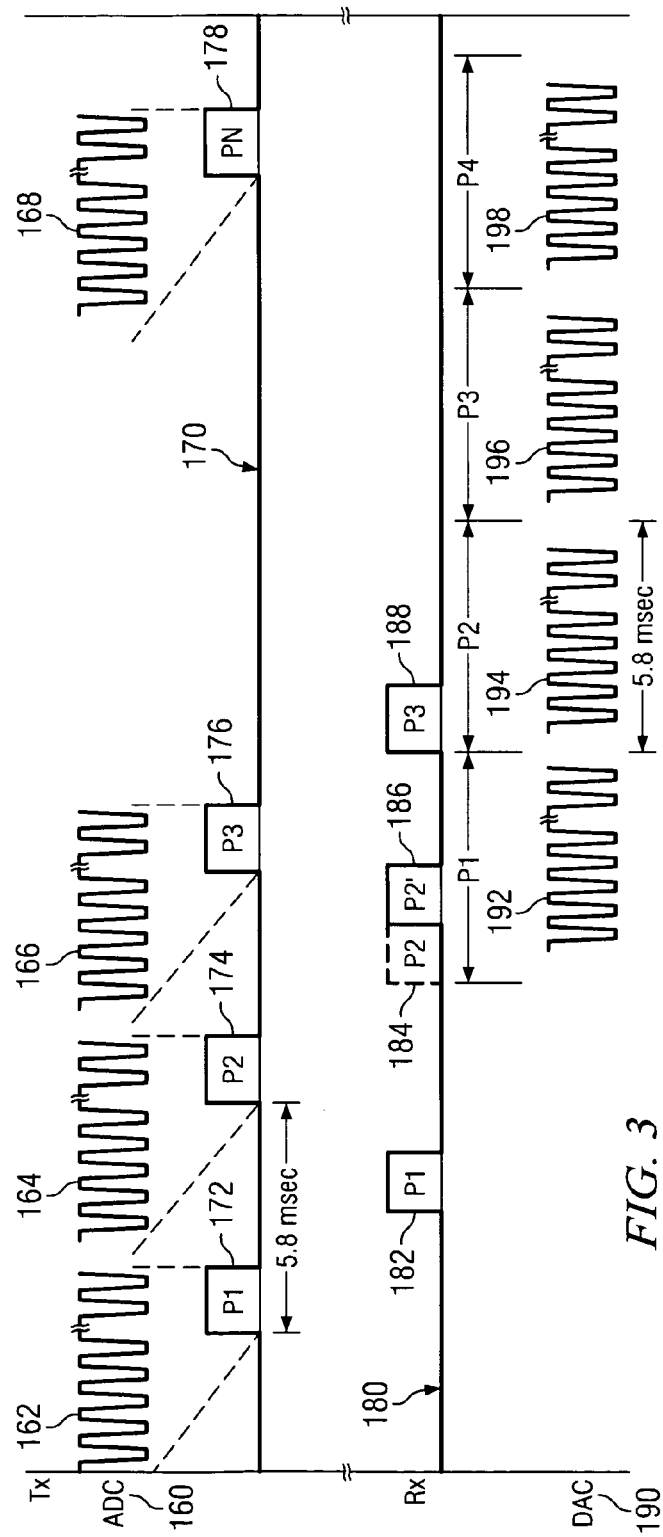
FIG. 3 illustrates multimedia data in packet form being transmitted and received, where one packet not received must be re-transmitted.

Referring to FIG. 3, there is illustrated a composite graph of multimedia data in packet form being transmitted, and received by one receiver, where one packet not received is re-transmitted. The transmitted data is shown in the first 160 and second 170 rows of the graph, as digitized data output by the ADC 92 in the transmitter 12 in the first row 160 and as packetized data output by the transmitter 12 in the second row 170. The packetized data is formed in the transceiver and controller 28 following compression of the digitized data in the JPEG2000 engine 96, a part of the encoder 30. The digitized data 162 in the first row 160 is shown as first packet P1 (172) in the second row. Similarly, the digitized data 164 and 166 in the first row 160 are shown as second packet P2 (174) and third packet P3 (176) in the second row 170. An nth packet Pn (168) is shown in the first row to indicate the full sequence of the multimedia data packets output by the transmitter 12. A 5.8 msec (5.8 milliseconds) time interval indicates the rate at which data packets are output, as indicated between the rising edge of the first and second data packets 172, 174 in the second row 170 of the graph in FIG. 3.

The received data is shown in the third 180 and fourth 190 rows of the graph, as packetized data input to the receiver 16 in the third row 180 and as digitized data output by the JPEG2000 engine 126 in decoder portion 36 of the receiver 16 in the fourth row 190. The packetized data is deconstructed in the transceiver and controller 34 followed by decompression of the digitized data in the JPEG2000 engine 126, a part of the decoder 36. The received packetized data in the third row 180 is shown as first packet P1 (182), second packet P2' (186), and third packet P3 (188). Shown in phantom at packet P2 (184) is the expected position in time of the second packet P2 (174) if it had been successfully received. It is immediately followed in the third row 180 by a successfully received second packet P2' (186) that was re-transmitted by the transmitter 12 upon receiving no acknowledgment from the receiver 16 that packet P2 (174) was received. This process will be further described infra with the description of FIG. 10. Similarly, the digitized data 192, 194, 196, and 198 shown in the fourth row 190 after being deconstructed from the first 182, second 186, and third 188 packets P1, P2', and P3 of the third row 180. An 4th packet P4 (198) is shown in the fourth row to indicate the next packet to be processed by the decoder 36. A 5.8 msec time interval shown in the fourth row indicates the rate at which data packets are processed in the receiver 16, as indicated between the rising edge of successive data packets 194, 196 in the fourth row 190 of the graph in FIG. 3.

It will be appreciated that the 5.8 msec interval identified in the fourth row of FIG. 3 is also the length or duration of a data packet to be converted to analog form by the DAC 122 in the decoder 36 portion of the receiver 16 shown in FIG. 1B. This 5.8 msec interval is also the same duration as the original data corresponding to that portion of the original multimedia audio signal that was input to the ADC 92 in the encoder 30 portion of the transmitter 12 shown in FIG. 1A. Thus, FIG. 3 illustrates that the original multimedia signal input to the transmitter 12 is reproduced by the receiver 16 in real time and at the same rate after a nominal delay that is indicated by the relative positions of the corresponding transmitted and received data packets in the second 170 and third 180 rows of FIG. 3. For example, received data packet P1 (182) appears later in time than transmitted data packet P1 (172), and so on for each data packet in the multimedia signal.

Referring to FIG. 4A, there is illustrated a composite graph of a first example of multimedia data packets being transmitted and received by first and second receivers, wherein the received data packets are temporarily buffered in the receiver, wherein a second data packet to the second receiver is re-transmitted, and wherein the beginning of playback of decompressed and converted multimedia data in each receiver are shown in relative time relationships. The first 200, second 210, and third 220 rows respectively illustrate multimedia data packets that are transmitted by transmitter TX and received by first receiver RX A and second receiver RX B. Packets 202, 204, 206, and 208 are shown as transmitted packets P1, P2, P3, and P4 in the first row 200. Packets 212, 214, 216, and 218 are shown as packets P1, P2, P3, and P4 in the second row 210 that are received by the first receiver RX A. Packets 222, 224/226, 228, and 230 are shown as packets P1, P2/P2', P3, and P4 in the third row 220 that are received by the second receiver RX B. It will be observed that, while both receivers RX A and RX B receive the same data packet string sent by the transmitter TX, the second packet transmitted—P2 (204)—was not successfully received by the second receiver RX B. Thus, the second packet P2 (204) was re-transmitted by the transmitter TX and received as packet P2' (226).

Figure 4B:
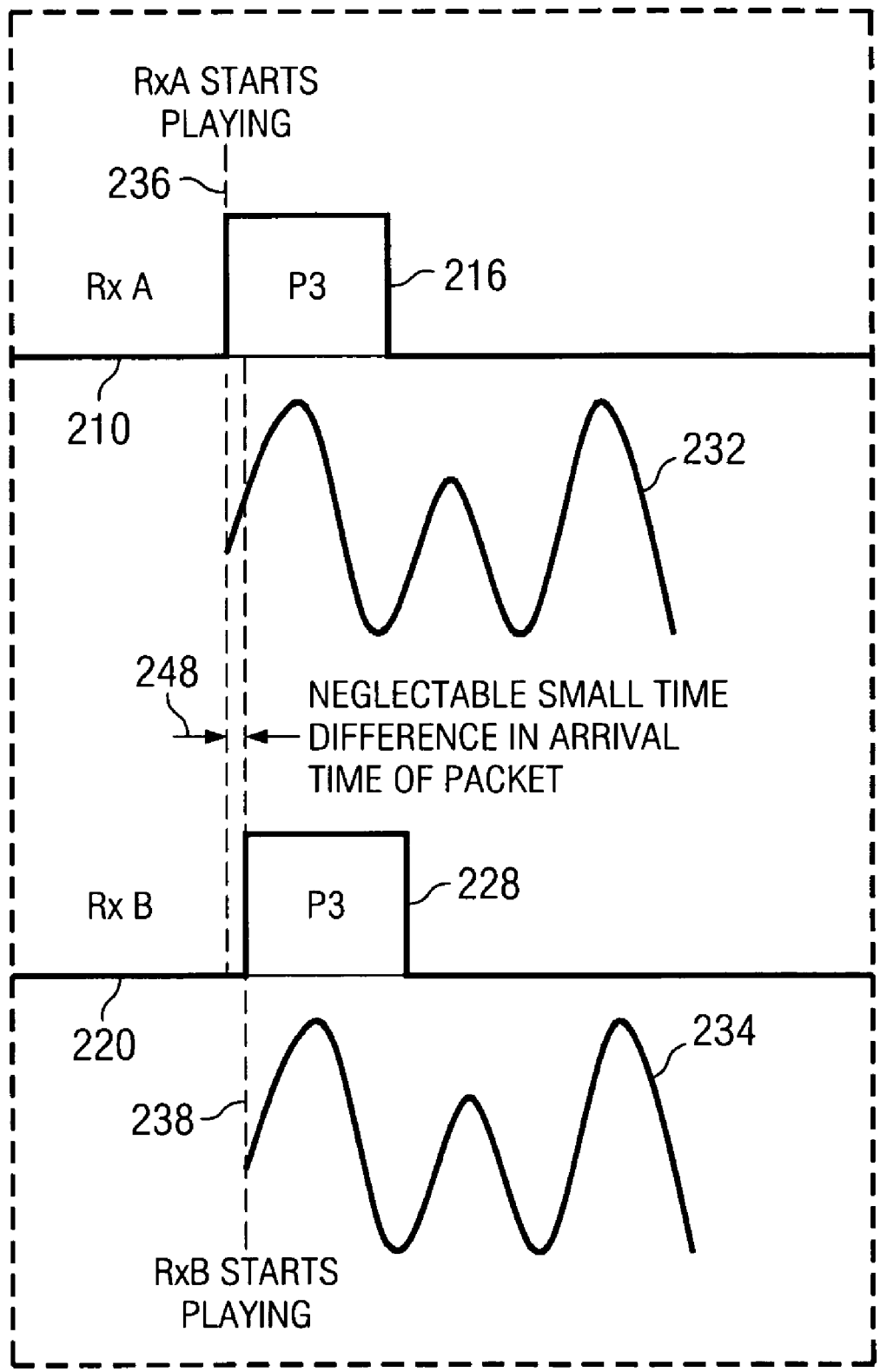
FIG. 4B illustrates an enlarged view of a portion of FIG. 4A for showing that the first and second receivers having slightly different packet arrival times are synchronized within a negligible offset.

FIG. 4A also shows the playback of the first packets P1 (212, 222) of the multimedia data that begins at approximately the same instant that the third packets P3 (216, 228) are received respectively in the first and second receivers RX A, RX B, as shown by the analog waveforms 232 and 234 in the second 210 and third 220 rows of the graph. This timing is a consequence of the two packet capacity of the reserve buffers (not shown in the block diagram of FIG. 1B but are represented in FIGS. 4A and 5 to be described infra) in the receivers that are provided to reserve the two most recent data packets received in order to allow time for re-transmitting data packets that may be lost, corrupted or otherwise unacknowledged following their transmission. Close observers will note that playing of P1 (222) in the second receiver RX B, at waveform 234, begins slightly later in time than the playback of the same packet in the first receiver RX A, at waveform 232. This delay will be discussed in FIG. 4B infra, which presents the portion of FIG. 4A within the dashed line box in an enlarged view.

The reserve buffer mentioned previously is illustrated in schematic form for the second receiver RX B in FIG. 4A at locations 240, 242, 244, and 246, just below the third row 220. Although both receivers RX A and RX B utilize reserve buffers for storing two data packets, only the reserve buffer for one of the receivers, RX B, is shown in FIG. 4A because they operate in the same way. The reserve buffer 240 et seq (meaning that the same reserve buffer is shown at four successive times), illustrates its contents at each time a successive data packet is received by the second receiver RX B. The reserve buffer is shown aligned with the initial edge of the respective data packet with which its contents (i.e., the last entered packet) corresponds. The reserve buffer is a FIFO memory location in the MCU 112 of the receiver of sufficient capacity to accommodate storing two full data packets of, in this illustrative example, two X 1024 bytes or, 2048 bytes.

Thus, the offset between the arrival of a data packet in the receiver and the playback of the data packet in the receiver is generally of two data packets' duration. As will become apparent in the description that follows, the reserve buffer is used to ensure that the playback in the receiver occurs continuously, even when re-transmission of the data packets is needed.

Continuing with FIG. 4A, when reception of data packets begins, the reserve buffer is assumed to be empty. As the first packet P1 is received, it is stored and occupies the position 240' in the buffer 240. As the second packet P2 is received and stored, it occupies the position 242' and the first packet P1 is pushed to the position 242" as shown in the reserve buffer 242 that is aligned with the beginning of the second packet P2 (226) as it was received after re-transmission. In this example, the first attempt to verify reception of the second packet P2 (204) at the position in time represented by packet 224 failed, so it was re-transmitted and successfully received at the next packet interval, identified by the data packet 226. As third packet P3 is received (at 228) and stored, it occupies the position 244' in the reserve buffer 244 and the second packet P2 is pushed to the position 244" in the reserve buffer 244, which is aligned with the beginning of the third packet P3 (228). In this case, the first data packet P1 is extracted from location 242" of the reserve buffer to be decoded by the decoder 36 in the receiver 16. In practice, each packet to be decoded is withdrawn, i.e., extracted by the decoder upon an appropriate trigger signal, to be described herein below. Similarly, as the fourth packet P4 is received (at 230) and stored, it occupies the position 246' and the second packet P3 is pushed to the position 246" as shown in the reserve buffer 246 that is aligned with the beginning of the fourth packet P4 (230). When the next data packet is received, the "first-in" packet P2' is extracted by the decoder for decoding and playback, and so on until the multimedia program ends.

Referring to FIG. 4B, there is illustrated an enlarged view of a portion of FIG. 4A showing how the two receivers RX A and RX B receiving the same data stream may initiate playback at slightly different times because of differences in the path length of each receiver from the transmitter. In FIG. 4B, the same reference numbers are used to indicate the same portions of the graphs shown in FIG. 4A. Because of the synchronization method described herein, the playback of the decompressed data in both the first and second receivers of FIGS. 4A and 4B is synchronized within a negligible offset. A review of the reception process just described will demonstrate this result. Each receiver will store the data packets into its reserve buffer until the required number of data packets are reserved, in this example, the first two data packets. Thereafter, it will wait to start decoding and playback until the next data packet is successfully received for the first time. Thus, if all receivers follow this rule, they will playback at almost the same pace provided that the packet arrival time difference between each of the receivers is small enough to be unnoticeable to the ear or eye. This difference in arrival time will generally be small enough—e.g., on the order of 1.5 usec (1.5 microseconds) if the distance from each of the receivers to the transmitter does not exceed approximately 300 meters. Thus, an area having a radius of 300 meters can accommodate many receivers that receive their signals from a single transmitter, wherein all of the receivers within the defined area begin the decoding and playback in synchronism at essentially the same instant within the small arrival time difference allowed.

Referring to FIG. 5, there is illustrated a second example of multimedia data packets being transmitted, received by first and second receivers and temporarily buffered, wherein a third data packet to the second receiver is re-transmitted, and the resulting beginning of playback of decompressed and converted multimedia data in each receiver are shown in relative time relationships. The first 300, second 310, and third 320 rows respectively illustrate multimedia data packets that are transmitted by transmitter TX and received by first receiver RX A and second receiver RX B. Packets 302, 304, 306, and 308 are shown as transmitted packets P1, P2, P3, and P4 in the first row 300. Packets 312, 314, 316, and 318 are shown as packets P1, P2, P3, and P4 in the second row 310 and received by the first receiver RX A. Packets 322, 324, 326/328, and 330 are shown as packets P1, P2, P3/P3', and P4 in the third row 320 and received by the second receiver RX B. It will be observed that, while both receivers RX A and RX B receive the same data packet string sent by the transmitter TX, the third packet transmitted—P3 (306)—was not successfully received by the second receiver RX B. Thus, the third packet P3 (306) was re-transmitted by the transmitter TX and received as packet P3'(328).

FIG. 5 also shows the playback of the second packets P2 (314, 324) of the multimedia data that begins at approximately the same instant that the fourth packets P4 (318, 330) are received respectively in the first and second receivers RX A, RX B, as shown by the analog waveforms 334 and 336 in the second 310 and third 320 rows of the graph. This timing is a consequence of the two packet capacity of the reserve buffers in the MCU 112 of the receivers that are provided to reserve the two most recent data packets received in order to allow time for re-transmitting data packets that may be lost, corrupted or otherwise unacknowledged following their transmission. In this example, playing of P2 (324) in the second receiver RX B, at waveform 336, begins at approximately the same time as the playback of the same packet in the first receiver RX A, at waveform 334, although, in general, there will be a slight time difference between the beginning of their playback as previously explained in the description of FIG. 4B.

Figure 10:
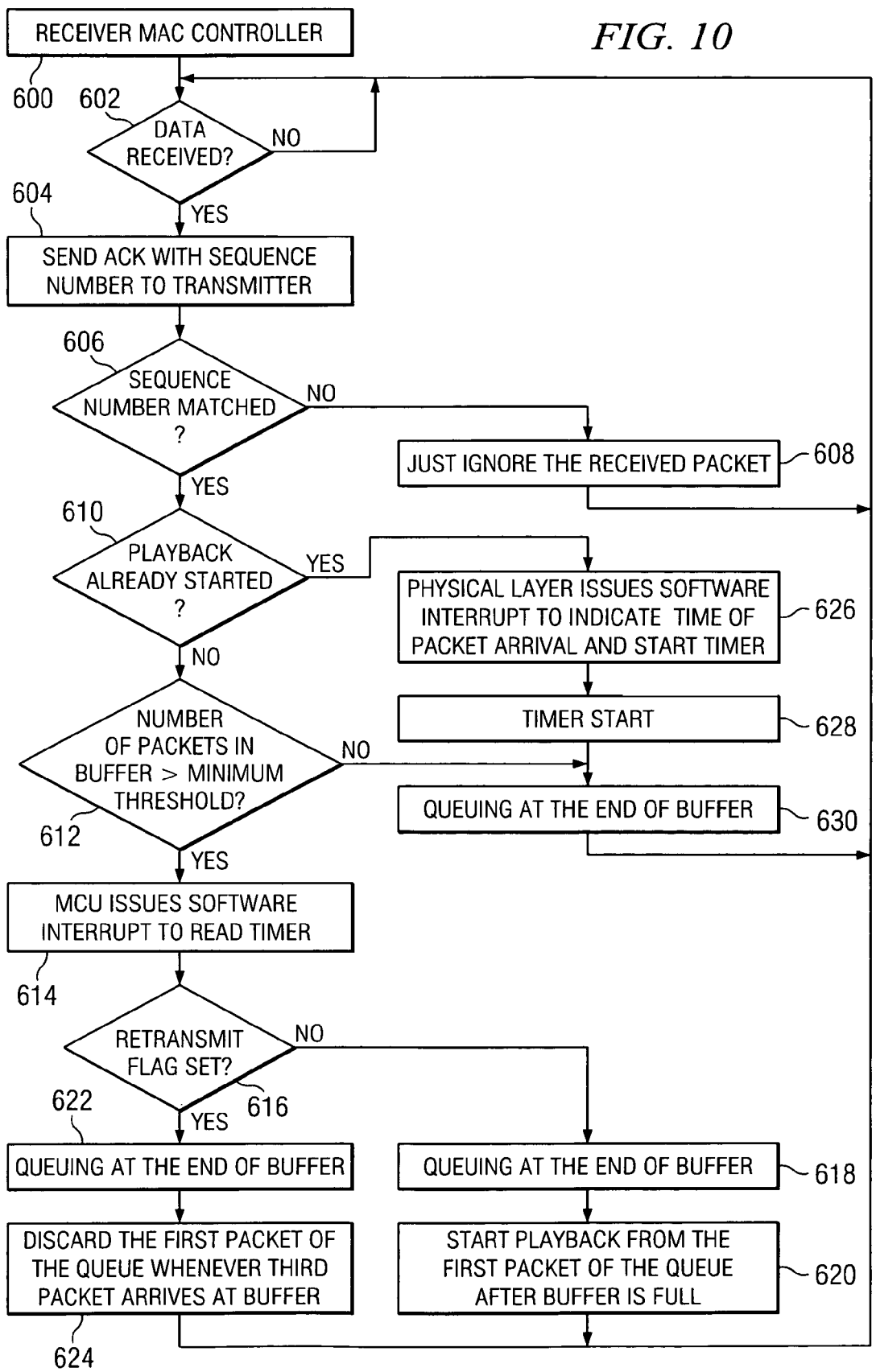
FIG. 10 illustrates a flow chart operative in the MAC controller of the receiver according to the present invention for synchronizing each receiver to the transmitted packet data.
Figure 11:
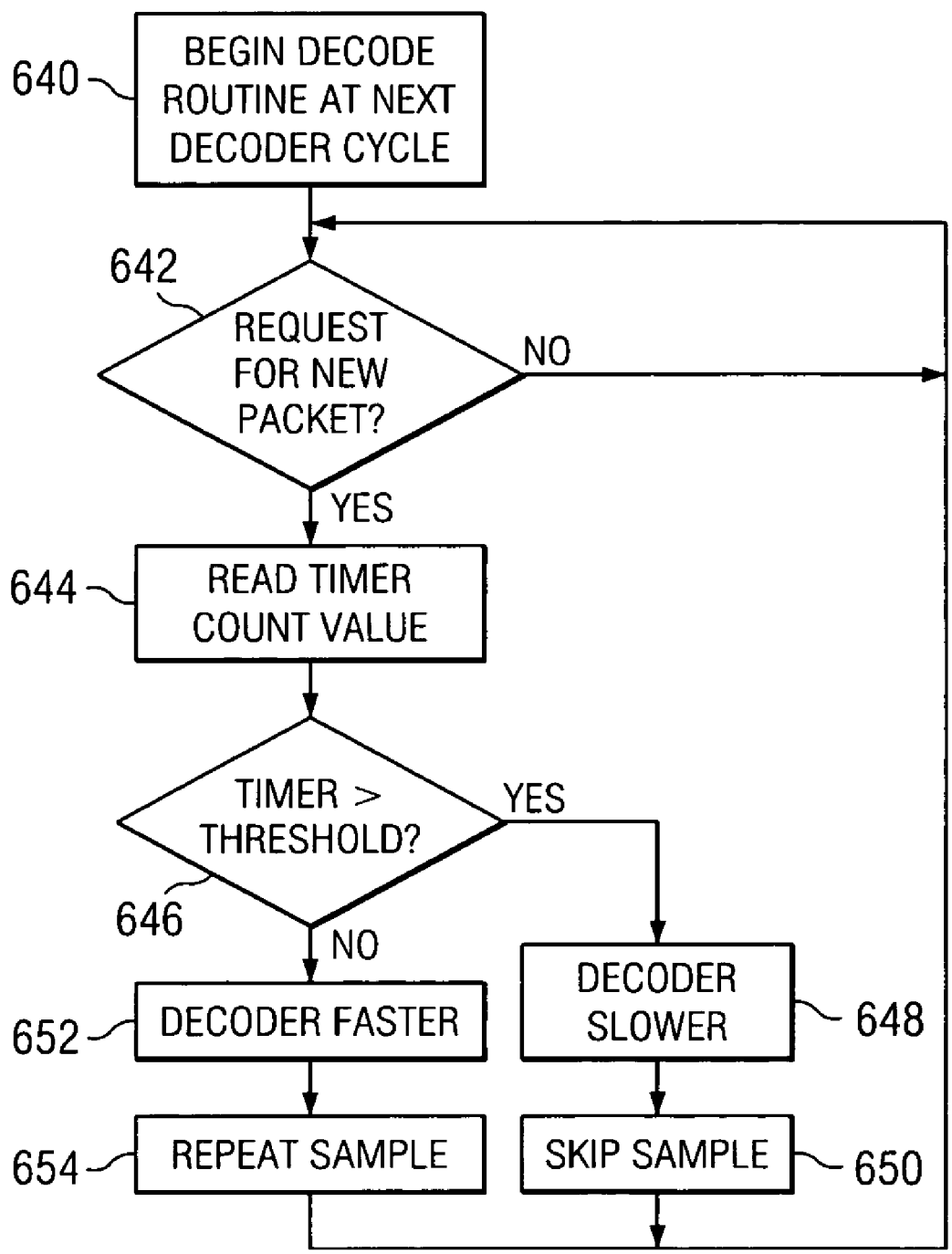
FIG. 11 illustrates a flow chart operative in each receiver for decoding the packet data so that decompressed multimedia signals played back on a plurality of receivers remains synchronized.

Also shown in the example of FIG. 5 is that the first packet transmitted, P1, is received in both receivers RX A and RX B as packet 312 and 322 respectively, but that packet P1 is not played back in receiver RX B. This occurred because packet P1 was discarded from the buffer to make room for the re-transmitted packet P3' (328). This action enables playback of packets P2 (314, 324) from both receivers to occur at the same time to maintain synchronization. This action normally only occurs at the beginning of a new program sequence. It will be better understood with the following description of the buffer contents as the first packets are received, and further in the description as FIGS. 10 and 11 are described.

The reserve buffer in the second receiver RX B mentioned previously is illustrated again in FIG. 5 at locations 340, 342, 344, and 346, just below the third row 320. Although both receivers RX A and RX B utilize reserve buffers for storing two data packets, only the reserve buffer for one of the receivers, RX B, is shown in FIG. 5 because they operate in the same way. The reserve buffer 340 et seq is shown four times to illustrate its contents at each time a successive data packet is received. Further, in each instance, the reserve buffer is shown aligned with the initial edge of the respective data packet with which its contents (i.e., the last entered packet) corresponds. As described previously, the reserve buffer is a FIFO memory location in the MCU 112 of the receiver of sufficient capacity to accommodate storing two full data packets of, in this illustrative example, two X 1024 bytes or, 2048 bytes.

When reception of data packets begins, the reserve buffer is assumed to be empty. As the first packet P1 is received, it is stored and occupies the position 340' in the buffer 340. As the second packet P2 is received and stored, it occupies the position 342' and the first packet P1 is pushed to the position 342" as shown in the reserve buffer 342 that is aligned with the beginning of the second packet P2 (324) as it was received. As the third packet P3' is received after re-transmission and stored, it occupies the position 344' and the first packet P1 is pushed to the position 344" as shown in the reserve buffer 344 that is aligned with the beginning of the third packet P3' (328) as it was received after re-transmission. In this example, the first attempt to verify reception of the third packet P3 (306) at the position in time represented by packet 326 failed, so it was re-transmitted and successfully received at the next packet interval, identified by the data packet P3' 328. As third packet P3' is received (at 328) and stored, it occupies the position 344' in the reserve buffer 344 and the second packet P2 is pushed to the position 344" in the reserve buffer 344, which is aligned with the beginning of the third packet P3' (328). In this case, the first data packet P1 is pushed out of the reserve buffer and discarded as described previously.

In practice, each packet to be decoded is withdrawn, i.e., extracted by the decoder upon an appropriate trigger signal, to be described herein below. Continuing as before, as the fourth packet P4 is received (at 318, 330) and stored in the respective reserve buffers of the two receivers RX A and RX B, it occupies the position 346' in the respective reserve buffers and the third packet P3' is pushed to the position 346" in the respective reserve buffers as shown in the reserve buffer 346 that is aligned with the beginning of the fourth packet P4 (330). When the next data packet is received, the "first-in" packet is extracted by the decoder for decoding and playback, and so on until the multimedia program ends.

Referring to FIG. 6, there are illustrated first and second receivers receiving the same multimedia data signal but playing back asynchronously because their respective decoder processing rates differ slightly from the encoder processing rate in the transmitter. The first 400, second 410, and third 420 rows respectively illustrate multimedia data packets that are transmitted by transmitter TX and received by first receiver RX A and second receiver RX B. Packets 402, 404, 406, and 408 are shown as transmitted packets Pn−1, Pn, Pn+1, and Pn+2 in the first row 400. Packets 412, 414, 416, and 418 are shown as packets Pn−1, Pn, Pn+1, and Pn+2 in the second row 410 and received by the first receiver RX A. Packets 422, 424, 426, and 428 are shown as packets Pn−1, Pn, Pn+1, and Pn+2 in the third row 420 and received by the second receiver RX B. It will be observed that both receivers RX A and RX B receive the same data packet string sent by the transmitter TX after some transmission delay, Td. It will be appreciated that this transmission delay may typically be different for each receiver, even though FIG. 6 shows approximately the same amount of transmission delay for each receiver. The designations Td A and Td B to indicate the delay for each receiver TX A and TX B respectively.

However, while the data packets appear to be received in each receiver RX A, RX B at approximately the same time, allowing for the transmission delay Td, the beginning of playback of the corresponding analog signals may begin at different times in each receiver due to differing decoder processing rates (decoder rates). FIG. 6 thus shows the playback of the data packets Pn (432, 436) of the multimedia data begins at different times relative to the same instant. In this illustration, the data packets Pn are extracted from the reserve buffers some two packets' duration (the capacity of the buffers) later than they were entered into the reserve buffers, as represented by the dashed line 438. The playback waveform 432 in receiver RX A, on line 410 of FIG. 6, is shown beginning at an earlier time 440 and ahead of the reference line 438, indicating that the decoder rate in receiver RX A is proceeding faster than the encoder rate in the transmitter 12. The playback waveform 436 in receiver RX B, on line 410 of FIG. 6, on the other hand, is shown beginning at a later time 442 and behind the reference line 438, indicating that the decoder rate in receiver RX B is proceeding slower than the encoder rate in the transmitter 12. The task of the synchronizing method in the respective receivers is to adjust the decoding rate continuously so that the decoding rate in all of the receivers receiving the same multimedia data signal remains the same.

Referring to FIG. 7, there is illustrated a graph showing the first, second, and third receivers receiving the same multimedia data signal and playing the data synchronously except that the first and second receivers are playing the wrong data packet. FIG. 7 is presented like FIG. 6 and shows reception of a packetized multimedia data signal from a single transmitter by three different receivers, RX A, RX B, and RX C, respectively on lines 500 (for the transmitted signal), and 510, 520, and 550 for the three receivers. The transmitted packets are, in sequence, Pn−1 (502), Pn (504), Pn+1 (506), and Pn+2 (508). The received packets for receiver RX A are respectively 512, 514, 516, and 518. The received packets for receiver RX B are respectively 522, 524, 526, and 528. The received packets for receiver RX C are respectively 552, 554, 556, and 558.

The playback of the data packets of the nth transmitted data packet Pn should occur two packet durations later, at the time that the Pn+2 data packet is being entered into the reserve buffers of each of the receivers. This is the time the decoder in each receiver is triggered to extract the first-in data packet stored in the reserve buffer. However, it may sometimes happen that data packets are decoded one packet faster or slower than the correct point in time. The results are illustrated in the playback waveforms of receivers RX A and RX B, where data packet Pn−1 is being played back as waveform 532 on receiver RX A at the time for data packet Pn, and where data packet Pn+1 is being played back as waveform 536 on receiver RX B at the time for data packet Pn. Thus, receiver RX A is playing at one packet delay, and receiver RX B is playing at one packet overhead (advance). To prevent such delays or overhead from occurring, each data packet, as it is generated in the transmitter, is assigned a sequential number, called a sequence number 148, that is inserted into the data packet 140 following the destination address 146 as shown in FIG. 2 supra. As described previously, the sequence number is included in the acknowledgment that is sent to the transmitter by the receiver. This step will also be described in conjunction with FIGS. 9 and 10 herein below.

Figure 8:
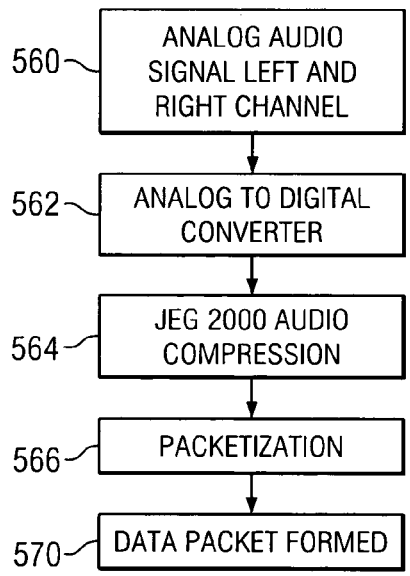
FIG. 8 illustrates a flow chart operative in the transmitter for conversion of an analog multimedia signal to packet data form.

Referring to FIG. 8, there is illustrated a flow chart operative in the transmitter for conversion of an analog multimedia signal to packet data form. As this process can be constructed in many different ways well-known to persons skilled in the art, depending upon the application and the particular hardware devices selected, the steps given represent an outline of the requirements. In FIG. 8, the process in the transmitter begins with the input of the original analog multimedia signals to the encoder section 30 of the transmitter 12 at step 560. In step 560 for the illustrated embodiment, the analog audio signals for the left and right channels of a stereo signal are applied to the respective left 40 and right 46 terminals of the encoder 30. The L (40) and R (46) analog signals are amplified and buffered in respective amplifiers 42, 48 before being conducted along lines 44, 50 to the analog to digital converter (ADC) 92 in step 562. Following conversion, the converted (sampled and digitized) signals are sent to the JPEG2000 engine 96 for audio compression in step 564 to reduce the bandwidth needed for transmission. The compressed data is assembled into data packets (Ref. No. 140 in FIG. 2) in step 566 and the data packet formed for transmission in step 568 by the MCU 82 in the transceiver and controller section 28 of the transmitter 12.

Figure 9:
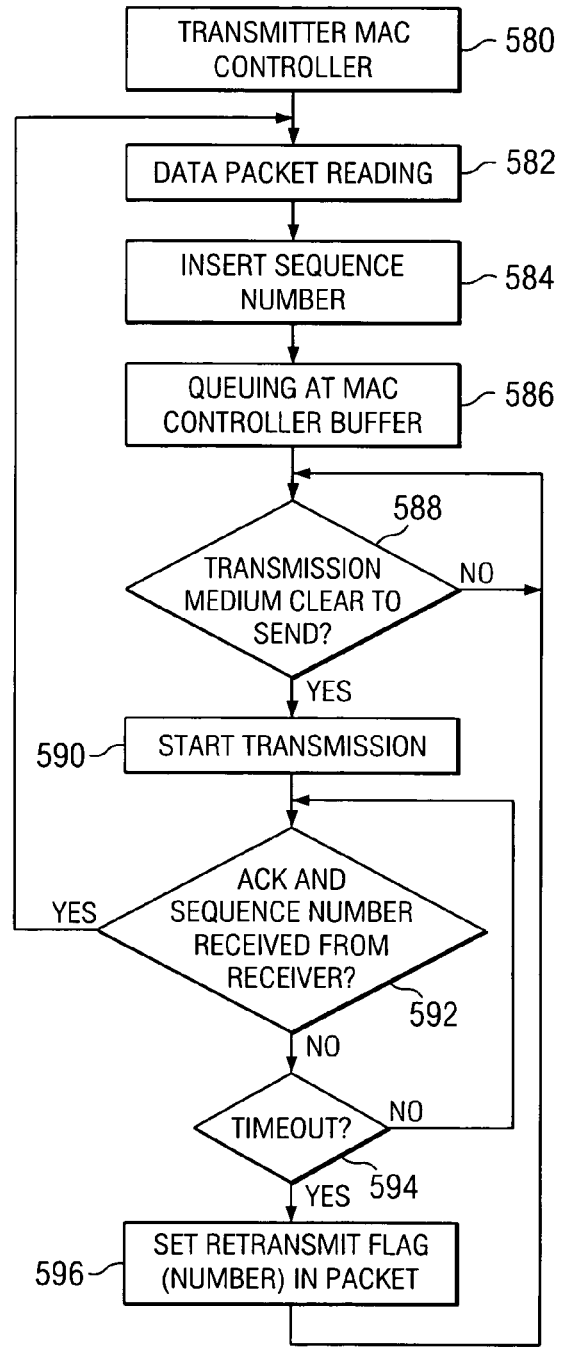
FIG. 9 illustrates a flow chart operative in the MAC controller of the transmitter of FIG. 8 for transmitting the packet data.

Referring to FIG. 9, there is illustrated a flow chart operative in the MAC controller of the transmitter 12 of FIG. 1A for transmitting the packetized data. The transmitter MAC controller resides in the INT5200 transceiver 80 of FIG. 1A and provides the implementation for the communications functions of the transmitter 12, such as controlling the traffic in the power line, re-transmission if necessary, quality of service, etc. These functions are just some of the tasks associated with providing for the multimedia data traffic on the AC power line in accordance with the HomePlug® 1.0 standard specification. The processing begins at step 580 wherein the transmitter MAC controller issues an instruction to read a data packet. In the next step 582 the data packet is read, followed by insertion of the sequence number in step 584. As previously described, the sequence number 148 (See FIG. 2) is generated in the transmitter 12 and represents a serial number of each one of a succession of data packets 140 that make up a complete transmission of data. For multimedia data, such succession of data packets may extend continuously for long periods of time. The sequence number provides a way for the receiver to verify that a data packet 140 just received is the correct next data packet to be processed in the receiver and to acknowledge that fact to the transmitter.

Continuing with FIG. 9, the flow proceeds to step 586 where queuing of the data at the transceiver's MAC controller buffer occurs in preparation for transmission. Next, in decision step 588, the controller requests a determination be made whether the transmission medium condition justifies that the medium is clear to send? In the case of a negative response from the decision test, the flow returns to the entry path to repeat step 588. In the case of an affirmative response from the decision test, the flow advances to step 590 to start transmission of the data packets, followed by another decision step 592. Step 592 determines whether an acknowledgment (ACK) combined with a sequence number of the data packet 140 just transmitted is received by the transmitter from the receiver. If the response is affirmative, the flow returns via the Yes path to read the next data packet at step 582; otherwise, the flow advances via the No path to step 594, which is a timed step that checks whether a countdown timeout limit has been reached.

The countdown timer in step 594 starts at 2.0 msec (2.0 milliseconds) and counts down to zero, providing enough delay before the transmitter decides that the data packet just transmitted has been lost because no acknowledgment was received within the 2.0 msec time period. In the event that the timeout limit is not reached, the process returns along the No path to enter decision step 592 and it tries again to obtain an acknowledgment that the data packet was received. In the event that the timeout limit is reached, the flow advances along the Yes path to step 596 to set a re-transmit number or flag 150 in the data packet 140 (See FIG. 2) to indicate to the receiver that this data packet, upon receipt, is one that has been re-transmitted. After the re-transmit number 150 is set, the process returns to enter decision step 588. If the re-transmit number 150 is 1, then the data packet has been re-transmitted once; if it is 2, then it has been re-transmitted twice. If it is zero, which is the way the data packet is initially configured, the data packet is recognized in the receiver as an original data packet that has not been re-transmitted. Data packets having a re-transmit number 150 of zero are also called "success" packets because they are data packets that have been successfully transmitted and received. During the description of FIG. 10 to follow, it will be seen that only "success" packets are stored in the reserve buffer for subsequent processing by the decoder.

Data packets 140 that need further re-transmission—i.e., beyond a re-transmit number 150 of 2—will not be transmitted again. In other words, they will be rejected by the receiver because the reserve buffer capacity is limited to two data packets. Thus, one of the important facts about FIG. 9 is that it illustrates the use of the sequence number 148 and the re-transmit number 150 in the operation of the invention. To summarize, the sequence number 148 and the re-transmit number 150 are data that are used by the receiver during the process of maintaining synchronization (a) of each of a plurality of receivers that receive packetized multimedia data from a single transmitter, and (b) of the decoder in each receiver with the encoder in the transmitter. This synchronization process will be described further in the following description for FIGS. 10 and 11.

During much of the description in FIG. 9, the process is described in terms of one receiver 16 responding to the transmitter 12. Thus, it may be asked, how does the transmitter respond in step 592 when more than one receiver 16 is acknowledging the successful receipt of a data packet; that is, a data packet having a correct sequence number 148 and a verified CRC check sum 154? The answer lies in the processing performed by the CSMA/CA mechanism in the physical layer in the (HomePlug®) transceiver. Details may be found in the Technical Reference Manual for the INT5200 Single Chip Transceiver, Copyright 2004, available from the manufacturer, Intellon corporation, at www.intellon.com, and the HomePlug® 1.0 Technology White Paper, available at www.homeplug.org. Both of the foregoing documents are herein incorporated by reference. In brief, the ACK signal will be sent from each receiver, one by one. If a collision is detected, the receiver will wait for a time before transmitting the ACK again. Thus, the transceivers in each of the receivers 16 and the transmitter 12 interact until the acknowledgment is accomplished. In practice, the ACK sequence is not predictable and depends heavily upon the status and conditions on the medium, the AC power line. Ideally, after the data packet is received by, e.g., receivers RX A and RX B, it would be expected that the ACK is to be received by the transmitter TX from RX A and then RX B. However, it does not matter if the ACK sequence is reversed, as long as the ACK is received before the timeout step 594 ends.

Referring to FIG. 10, there is illustrated a flow chart operative in the MAC controller of the receiver 16 according to the present invention for synchronizing each receiver to the transmitted packet data. The receiver MAC controller resides in the INT5200 transceiver 110 of FIG. 1B and provides the implementation for the communications functions of the receiver 16, such as controlling the traffic in the power line, performing error detection, etc. in the PHY layer, and checking the sequence number in the Ethernet MAC driver to prevent the same data packet being received twice, thus ensuring that a continuous stream of data packets is received. These functions are just some of the tasks associated with providing for the multimedia data traffic on the AC power line in accordance with the HomePlug® 1.0 standard specification.

The processing begins in FIG. 10 at step 600 wherein the receiver MAC controller is active, and, in the following step 602, awaiting the arrival of a data packet. If a data packet is not received the flow circulates in a return loop via the No path until a data packet is received at decision step 602. A data packet is successfully received if its destination address 146 and the check sum 154 are verified in step 602 after receipt of the entire data packet, causing the flow to advance to step 604 along the Yes path to send an acknowledgment, combined with the sequence number 148, to the transmitter. In the next decision step 606, the sequence number 148 is tested for a match with the next expected sequence number. If the answer is negative, the flow proceeds along the No path to a step 608 to ignore the received data packet and return to enter decision step 602. If the response to step 606 is affirmative, the flow proceeds along the Yes path to another decision step 610.

Before continuing with the flow chart description, it will be helpful to point out that FIG. 10 illustrates the processes of several conditions that can occur in the receiver 16 during reception of data packets from a transmitter 12. A first condition, the arrival of the first data packet in the multimedia program, i.e., when there has been no reception or playback of data packets during the period immediately preceding the arrival of the first data packet, will follow the No path from the decision step 610. The first condition holds for the arrival and storage in the reserve buffer of the first two data packets, which will fill the reserve buffer. A second condition, the arrival of subsequent data packets after the first and second data packets, will follow the Yes path from the decision step 610 and cause the count up timer to start counting in increments of, in this illustrative example, 1.0 microsecond (1.0 usec). This second condition leads to the initiation of playback of the data packet content signals. A third condition occurs as a sub-set to the first condition in the event that the retransmit number is non-zero, indicating a re-transmitted data packet.

Returning to FIG. 10, in the decision step 610, it is determined whether playback of the data has already started? If not, according to the first condition, the flow follows the No path to another decision step 612 to determine if the number of data packets stored in the reserve buffer exceeds the minimum threshold (designated by the letter M) of two data packets? If the response is negative, that is, the reserve buffer is not full, the flow follows the No path and queues the data packet to enter the reserve buffer in the end location of the reserve buffer in step 630. Thereafter, the flow returns to enter the decision step 602. If the response to the decision step 612 is affirmative, meaning that the reserve buffer is full, i.e., M=2, the flow proceeds along the Yes path to step 614 whereupon the MCU 112 issues a software interrupt to read the count up timer, i.e., read the accumulated time value in the timer. It will be observed that, if playback has not already begun, the value in the timer will be zero because the timer has not been started. After issuing the software interrupt in step 614, the flow advances to a decision step 616 to determine whether the re-transmit flag or number 150 in the data pack 140 has been set, i.e., is non-zero? If the response is negative (meaning that the re-transmit number is zero and the data packet is an original, fully received and acknowledged data packet), the flow continues within the first condition via the No path to step 618 to be queued into the end location of the reserve buffer. Thereafter, the process advances to step 620 to cause the decoder to start playback, after the reserve buffer is full (M=2), by withdrawing or extracting the first data packet from the "first" location of the queue in the reserve buffer. If, in step 616, the response is affirmative (meaning that the re-transmit number 150 is not zero and the data packet thus received has been re-transmitted at least once), the flow proceeds within the third condition—the sub-set of the first condition—to queue the data packet at the end location of the reserve buffer from which position it will be discarded. Following this action, the flow returns to enter the decision step 602.

Returning to the decision step 610, the second condition will now be described, which occurs in the event that the response of the decision step 610 is affirmative, indicating that the playback of the data packet(s) has already started. The flow thus follows the Yes path to step 626 whereupon the PHY layer in the MAC controller 110 in the receiver 16 issues a software interrupt to indicate the time of packet arrival and start the count up timer, followed by the triggering of the timer in step 628. After the timer is started, the flow proceeds to step 630 queue the data packet into the end location of the reserve buffer.

Now, a word about the timer (the count up timer) and the two software interrupts just described is warranted before proceeding further. First of all, the software interrupt issued by the MAC controller 110 that occurs in step 626 to start the timer may be called the "timer start" interrupt and corresponds to the arrival of a data packet during the second condition, after playback of data packets has already started. Second, the software interrupt issued by the MCU 112 that occurs in step 614 to read the value in the timer may be called the "start decode" interrupt and corresponds to triggering the decoder to begin extracting data packets from the reserve buffer so that playback may begin in the receiver 16. It will be appreciated that the "timer start" interrupt corresponds to the rate of the encoder in the transmitter and the "decoder start" interrupt corresponds to the rate of the decoder in the receiver. Thus, by implementing a single timer in the receiver 12, and controlling this timer with separate software interrupts, one related to the encoding rate in the transmitter and the other related to the decoding rate in the receiver, the difference between the decoding and the encoding may be tracked continuously and used to maintain all of the receivers in synchronism with each other. This process will be described further in FIG. 11. Moreover, the same system also ensures that all of the receivers start at the same time because the timers in all of the receivers are keyed by the "timer start" interrupt to begin processing at the same time. As will be described in FIG. 11, the value of the accumulated time counts in the timer is somewhat arbitrary and may be set in the illustrative embodiment to 500 usec (500 microseconds). This 500 usec timer threshold value (N) is empirically determined, and can be understood as the processing delay between a receiver 16 and the transmitter 12. The 500 usec value of N is chosen to enable all receivers to have the same constant relationship with the transmitter and its encoder. The value of N could be chosen to be, for example, 400 usec or 600 usec, or some other value depending upon the application. Persons skilled in the art will appreciate that the threshold value N must be large enough to provide sufficient processing delay to synchronize the decoders with the encoder using the two-packet buffered storage yet avoiding perceptible delay artifacts during the playback of any one receiver or among any two receivers. However, this second threshold value used in the present method has no relationship to the sampling rate or any other rate of processing in the encoder or the decoder.

Referring to FIG. 11, there is illustrated a flow chart operative in each receiver for decoding the packet data so that decompressed multimedia signals played back on a plurality of receivers remains synchronized. The process begins in a step 640 at the start of a new decoder cycle under the control of the MCU 112 and proceeds to a decision step 642 to determine whether a request for a new data packet has been issued? If the response is negative, the flow returns via the No path to re-enter the decision step 642. If the response is affirmative, the flow advances to step 644 to read the accumulated timer count value. In the next step, the accumulated timer value read in step 644 is compared with the 500 usec threshold value in the decision step 646 to determine whether the timer value exceeds the threshold. If the result is affirmative, the decoder determines in step 648 that the decoder rate is slower than the encoder rate, followed by action necessary to skip the current sample in step 650. If the result is negative, that the time count accumulated in the timer is equal to or less than the threshold, the decoder determines in step 652 that the decoder rate is faster than the encoder rate, followed by action necessary to repeat the current sample in step 654.

The action to skip a sample occurs upon issuing a SKIP command to speed up the decoder by jumping to the next sample. The action to repeat a sample occurs upon issuing a RPT command to cause the decode engine to pause by keeping a sample to be repeated. Without this capability of adjusting the decoding rate in both directions—to increase or decrease the rate by skipping or repeating samples—the timing of the decoder relative to the encoder would gradually misalign until the misalignment is large enough to be noticeable. Further, by making very small adjustments at a rapid rate, i.e., for each and every data packet that is received, the adjustment process is inaudible. It will be observed in the foregoing that only two conditions are allowed: either the decoder rate is determined to be slower than the encoder rate (timer>threshold) or the decoder rate is determined to be faster than the encoder rate (timer< or =threshold). In this way, indeterminate conditions are avoided.

After the appropriate action is completed in either step 650 or step 654, the flow returns to the entrance to decision step 642 to request the next data packet. The decode routine continues, packet-by-packet, skipping a sample if the timer value exceeds the 500 usec threshold or repeating a sample if the timer value is found, after the comparison, to be equal to or less than the 500 usec threshold. Thus, the decode routine periodically adjusts the decoder rate to maintain the 500 usec time difference, i.e., the threshold N, which keeps the decoder synchronized with the encoder rate in the transmitter 12. In effect, the time difference N varies only slightly, maintaining the decoder and the encoder in a condition of dynamic equilibrium by minimizing the variation in the time difference value N. Another way to look at this is that the actual time difference N between the decoding operation is maintained at a constant 500 usec average delay relative to the encoding operation in the transmitter 12. Further, this same action occurs in each receiver 16, so that all of the receivers are playing back the multimedia program at the same time and at the same rate. This result has been accomplished without synchronizing the clock in the decoder to the clock in the encoder, which requires periodically transmitting samples of the encoder clock to each of the receivers, either directly or by including the clock samples in a start packet or the like.

Figure 12:
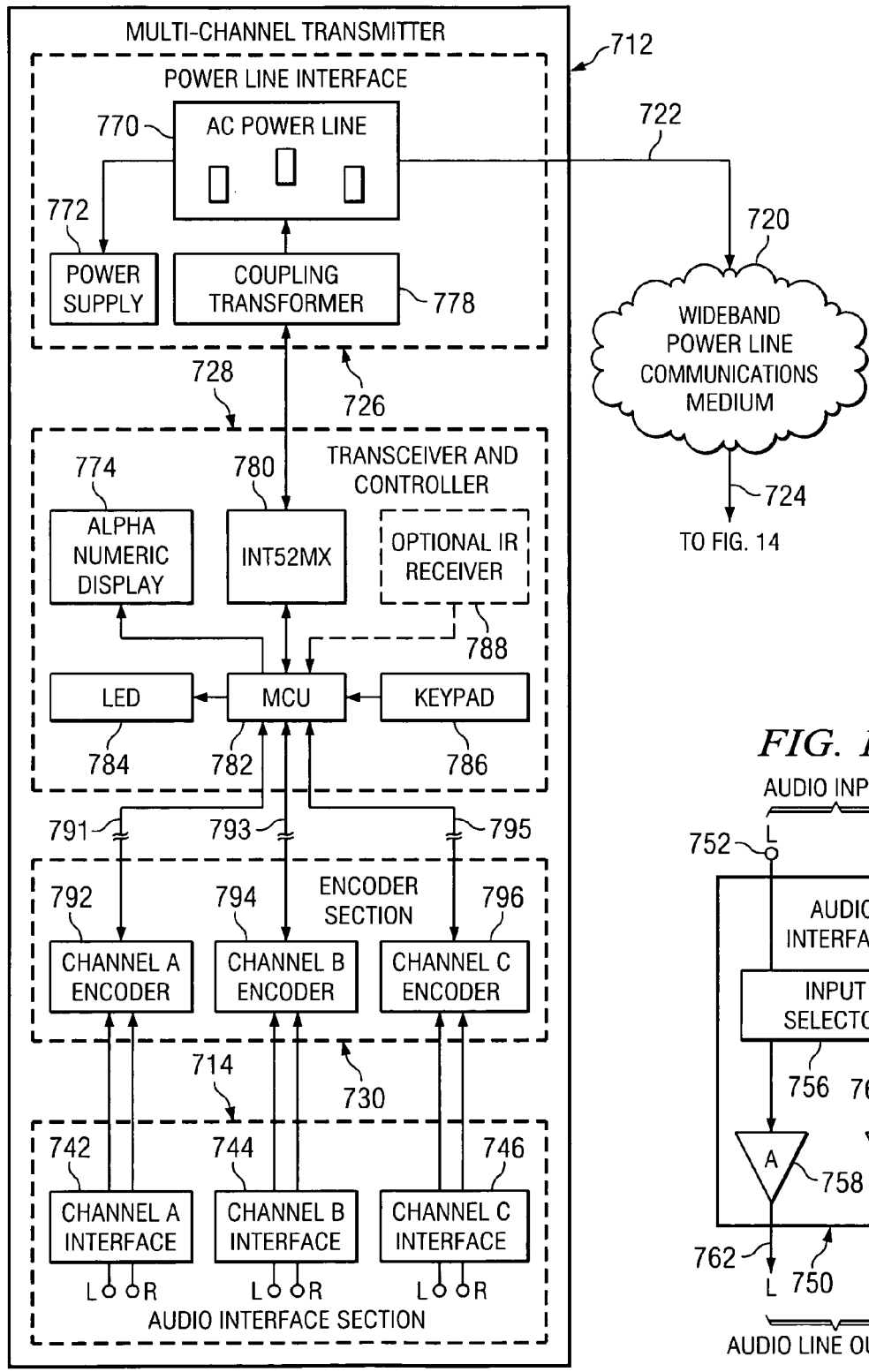
FIG. 12 illustrates a multichannel transmitter portion of a system block diagram according to one embodiment of the present invention.
Figure 13:
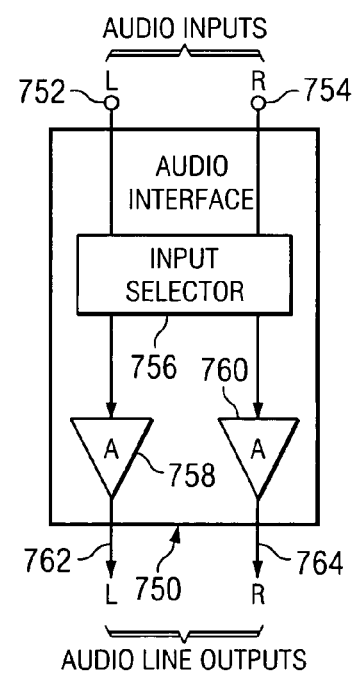
FIG. 13 illustrates a block diagram of an audio interface section of a multichannel transmitter for use with the embodiment of FIG. 12.
Figure 14:
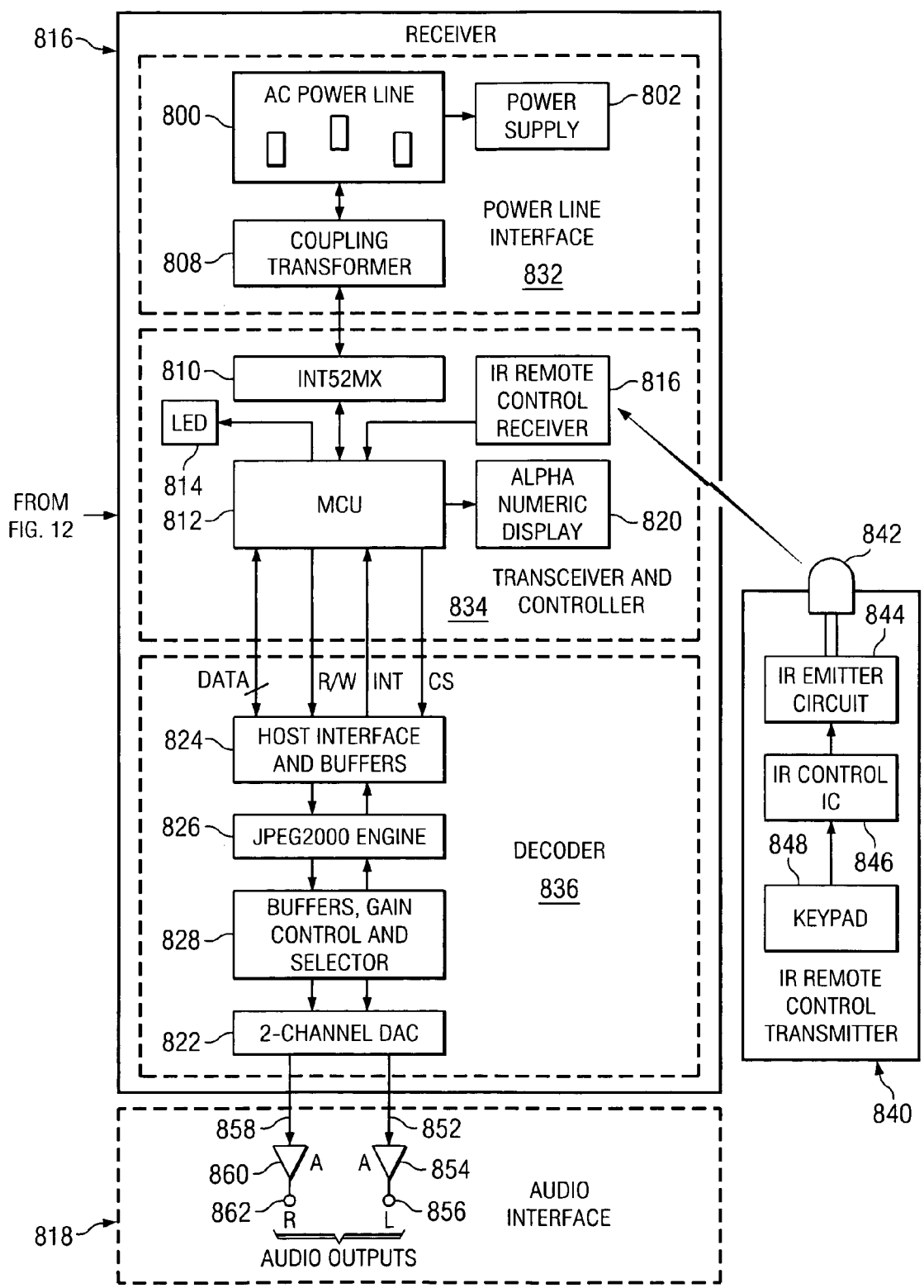
FIG. 14 illustrates a receiver portion of a system block diagram according to the embodiment of FIG. 12 of the present invention.

Referring to FIGS. 12, 13 and 14, together they illustrate a system block diagram of one specific embodiment of the present invention. FIG. 12 illustrates an embodiment of a multichannel transmitter portion of the system and FIG. 14 illustrates an embodiment of a receiver portion of the system for use with the multichannel transmitter of FIG. 12. FIG. 13 illustrates an audio interface section used in the transmitter of FIG. 12. In the following description, while the multimedia signal(s) that will be referred to are stereo audio signals, the synchronization methods described herein are not limited to audio signals but could be any type of analog multimedia signal as previously described. For purposes of illustration, the embodiment shown is configured to process multiple two channel stereo audio signals input to the transmitter. The receiver, of course, provides for the reception and reproduction of one stereo audio signal through loudspeakers, headphones, and the like. The system is also capable of processing audio signals to provide more than the traditional two-channel stereo when suitable processing apparatus is added to the system.

Referring to FIG. 12, there is illustrated a multichannel transmitter portion of a system block diagram according to one embodiment of the present invention. The multichannel transmitter 712 includes a power line interface 726, a transceiver-controller 728, an encoder section 730, and an audio interface section 714, all shown in dashed outlines in FIG. 12. The transmitter 712 is coupled to the receiver 816 (See FIG. 14) via a communications medium 720 through a transmit path 722 and a receive path 724. In the illustrative embodiment described herein, the communications medium 720 may be the standard AC power line network that exists in residences, businesses, etc. Thus, the transmit path 722 is the part of the power line coupled to the transmit end of the communications link through the communications medium 720, and the receive path 724 is the part of the power line coupled to the receive end of the communications link through the communications medium 720. The power line interfaces 726 connects the transmitter 712 to the transmit path 722. It will be appreciated that the configuration of the various principle sections of the transmitter 12 will be determined by the characteristics of the communications medium 720 that is selected for the specific implementation desired.

Continuing with the transmitter 712, the power line interface 726 includes an AC power line connector plug 770 coupled to a power supply 772 and a first winding of a coupling transformer 778. The power supply 772 provides operating voltages for the circuitry of the transmitter 712. The coupling transformer 778 provides the high frequency coupling for data packet signals between the transceiver-controller 728 and the AC power line connected to the connector plug 770. A second winding of the coupling transformer 778 is coupled to an output of a transceiver 780 in the transceiver-controller 728. The transceiver 780 is further coupled to and interacts with a microcontroller 782. The microcontroller 782 is provided for controlling the operation of the transceiver 780 and the encoder section 730, to be described. Further coupled to the microcontroller 782 may be an alpha-numeric display 774. The alpha-numeric display 774 may be a seven segment display to indicate a selected input channel, for example. Also coupled to the microcontroller 782 may be an LED indicator 784 and a keypad 786. The LED indicator 784 may include one or more LEDs depending upon the number of parameters or functions to be indicated. For example, a first LED could be included to indicate the status of the communication channel or link, i.e., busy or open, and a second LED may be used as a traffic indicator. In other embodiments a single LED may indicate more than one parameter or function according to the form of signal received by the LED indicator 784. The key pad 786, in one illustrative embodiment, may include different numbers of individual keys, depending on the kinds of command inputs needed to operate and control the particular implementation. For example, in one embodiment, four keys for respectively inputting commands such as channel, volume UP, volume DOWN, power ON/OFF, etc. may be provided. An optional Infra Red (IR) Receiver 788 connected to the microcontroller 782 may further be provided in the multichannel transmitter 712 to enable the reception of remote control signals from. e.g., an IR remote control transmitter such as the one to be described in conjunction with FIG. 14. Such control signals may be provided for selecting one among the multiple input channels, for example.

Coupled with the microcontroller 782 (also called the MCU 782) may be a signal bus 791, 793, and 795 coupled between the microcontroller 782 and each of the encoders 792, 794, and 796 in the encoder section 730. In the illustrative embodiment, the encoders 792, 794, and 796 are identified as Channel A, Channel B, and Channel C encoders, respectively, corresponding to three audio input channels.

Each of the encoders 792, 794, and 796 contain all of the same structures included in the encoder 30 of FIG. 1A described hereinabove and will not be described further. In FIG. 12, each of the signal buses 791, 793, and 795 include data, Read/Write (R/W), Interrupt, and Chip Select (CS) lines. Each of the encoders 792, 794, and 796 process signals output from an ADC portion of the encoder. Alternatively, the encoder may be coupled from a separate, external ADC in the case where particular performance levels are to be provided, as previously described.

The major sections of the transmitter 712 shown in FIG. 12, which may conveniently be implemented using off-the-shelf integrated circuits (ICs), include an INT5200 series transceiver (780) IC manufactured by Intellon Corporation, Ocala, Fla. 34482, an EZ80 microcontroller (782), available from many manufacturers, an ET83X431 Real-Time CODEC encoder in each of the individual encoders in the encoder section (730) manufactured by Etoms Electronics Corporation of Hsin-Chu City, Taiwan, R.O.C., and a standard two-channel, 16 bit ADC (such as the ADC 92 previously described for FIG. 1A hereinabove) IC available from many manufacturers. In some applications, the built-in ADC of the CODEC encoder may be suitable. However, for high quality audio, a 16 bit ADC is recommended. The INT5200 series transceiver 780, which is operated in the PHY mode and connects to the microcontroller 782 via the PHY interface in the illustrated embodiment, is especially adapted for data communications via the AC power line in compliance with the HomePlug® 1.0 industry standard specification. The reader is referred to the foregoing description for FIG. 1A for the description of the JPEG2000 engine in the ET83X431 CODEC used in the encoder section 730.

Referring to FIG. 13, there is illustrated a block diagram of an audio interface section of a multichannel transmitter for use with the embodiment of FIG. 12. The audio input interface 750 includes a left (L) channel input 752 coupled through an input selector 756 to a left channel audio amplifier 758 having an output coupled via line 762 to a left channel input of one of the channel encoders 792, 794, or 796 in the encoder section 730. The audio input interface 750 further includes a right (R) channel input 754 coupled through the input selector 756 to a right channel audio amplifier 760 having an output coupled via line 764 to a right channel input of the same channel encoder 792, 794, or 796 in the encoder section 730 selected for the left channel input. Three such audio interface 750 circuits may be coupled to the three audio input pairs of the encoders 792, 794, and 796. The audio inputs 752, 754 may be provided by a connector such as a receptacle or jack (not shown to enable connecting a program source device (not shown) to the transmitter 712. The input selector 756 may be coupled with the MCU 782 for enabling control by remote control as described herein below. Alternatively, the input selector 756 may be implemented using manual switching facilities located, for example on a front panel of the transmitter 712.

Referring to FIG. 14, there is illustrated a receiver portion of a system block diagram according to the embodiment of FIG. 12 of the present invention. A power line interface 832 includes an AC power line connector plug 800 coupled to a power supply 802 and a first winding of a coupling transformer 808. The power supply 802 provides operating voltages for the circuitry of the receiver 816. The coupling transformer 808 provides the high frequency coupling for data packet signals between the transceiver/controller 834 and the AC power line connected to the connector plug 800. A second winding of the coupling transformer 808 is coupled from an input of a transceiver 810 in the transceiver-controller 834.

The transceiver 810 is further coupled to and interacts with a microcontroller 812 (also called the MCU 812 herein below). The microcontroller 812 is provided for controlling the operation of the transceiver 810 and the decoder section 836, to be described. Further coupled to the microcontroller 812 is an LED indicator 814 and an alpha-numeric display 820. The LED indicator 814 may include one or more LEDs depending upon the number of parameters or functions to be indicated. For example, a first LED could be included to indicate the status of the communication channel or link, i.e., busy or open, and a second LED may be used as a traffic indicator. In other embodiments a single LED may indicate more than one parameter or function according to the form of signal used to activate the LED indicator 814. An Infra Red (IR) remote control receiver 836, in one illustrative embodiment, may be provided to enable control signals to be transmitted to the receiver 816 by the user from an IR remote control transmitter 840. The IR remote control transmitter 840 may include an IR-emitting device 142 driven by an IR emitter circuit 144, in turn controlled by an IR control integrated circuit (IC) 146. User inputs to the IR remote control transmitter may be entered using a keypad 148 that couples keypad signals to the IR control IC 146. The keypad 148 may include different numbers of individual keys, depending on the kinds of command inputs needed to operate and control the particular implementation. For example, in one embodiment, four keys for respectively inputting commands such as channel, volume UP, volume DOWN, power ON/OFF, etc. may be provided.

In one example of the use of the IR remote control transmitter 840, the user may enter a channel number selection by pressing the keys on the keypad of the remote control transmitter 840 (hereinafter RC transmitter 840) corresponding to the desired channel selection. In an alternative embodiment, the receiver 816 may be equipped with a keypad (not shown) located on a front panel of the enclosure of the receiver 816 to enable direct control of the channel selection. This action, in either embodiment, is followed by the RC transmitter 840 sending a signal to the MCU 812 which in turn assembles a data packet for transmission via the AC powerline to the system transmitter 712 to cause the MCU 782 in the transmitter 712 to switch to another audio stream, i.e., select a different audio input to the encoder section 730 of the transmitter 712. A similar function may be implemented in a similar way by including a remote control receiver (see the optional remote control receiver 788 in FIG. 12) in the system transmitter 712 as previously described, thus providing a direct command link to the system transmitter 712. Persons skilled in the art will appreciate the variety of control functions that may be implemented using the remote control capability provided thereby.

Coupled with the microcontroller 812 may be a plurality of data and/or control lines between the microcontroller 812 and the decoder 836. For example, in FIG. 14, the host interface and buffers 824 is coupled to the MCU 812 via data, Read/Write (R/W), Interrupt, and Chip Select (CS) lines. The decoder 836 includes its own set of data and control lines. The decoder 836 processes signals output from the microcontroller 812 in three main sections, in order identified as the host interface and buffers 824, to which the data and control lines to and from the microcontroller 812 are connected, a JPEG2000 decoder 826, and a section containing buffers, gain control and selector elements 828 for controlling the data signals output to the audio output interface 818. The JPEG2000 decoder provides for decompressing the digitized multimedia or audio data before being sent to the two-channel digital-to-analog controller (DAC) 822 for conversion to baseband audio signals for each left and right channel. In the illustrative embodiment, the DAC 822 may be an external 16 bit unit for high quality audio. Alternatively, for less stringent requirements, the 10 bit DAC built into the ET83X431 CODEC may be used. Following conversion, which includes low pass filtering to remove high frequency and sampling frequency components, the left and right audio signals are coupled to the audio output interface 818 to be amplified and coupled to the playback devices such as the left and right loudspeakers (not shown) or as line outputs to other devices for recording or playback. The audio output interface 818 may include left 852 and right 858 audio input lines respectively coupled to the inputs of audio power amplifiers 854 (left) and 860 (right) for driving loudspeakers via terminals 856 (left) and 862 (right). Alternatively, the amplifiers 854, 860 may be configured for providing line output signals to a recording or signal distribution device.

The major sections of the receiver 816 shown in FIG. 14 may be implemented using the same off-the-shelf components and circuitry as described hereinabove for FIG. 1B to provide the receiver 816 adapted for data communications via the AC power line in compliance with the HomePlug® 1.0 industry standard specification. The reader is referred to the foregoing description for FIG. 1B for the description of the JPEG2000 engine in the ET83X431 CODEC used in the decoder section 838.

In summary, the advantages of the present invention, apparent from the foregoing detailed description of several embodiments of the invention include the following. The method of synchronization disclosed herein eliminates the need for transmitting bandwidth-wasting transmitter clock signals or start packets, and minimizes the effects of collisions. The synchronization of the decoding and playback process in all of the receivers 16 with each other is continuous, not discontinuous, and the synchronization of each receiver is maintained continuously with the transmitter. Any receiver can join in and receive the packetized data anytime; there is no need to wait for synchronization to a specific clock signal to occur. The timing adjustments during decoding are carried out gradually and imperceptibly rather than instantaneously, resulting in more listenable playback. Synchronization is automatic; there is no need to provide calibration or set up of the system. The use of the reserve buffer, while not required to implement the synchronization method of the present invention, enables very smooth playback.

While the invention has been shown in only one of its forms, it is not thus limited but is susceptible to various changes and modifications without departing from the spirit thereof.

What is claimed is:

1. Apparatus for communicating multimedia data over a wired communication channel, comprising:

a transmitter, operating at a predetermined clock rate, coupled via an interface to the wired communication channel, and further having an encoder for forming data packets having at least a packet sequence number and a packet re-transmit number associated with the data packet; and a receiver, coupled via an interface to the wired communication channel and having a timer and a decoder, wherein the decoder operates at a clock rate that is substantially the same as the clock rate of the encoder in the transmitter but independent therefrom;

means for receiving user entered signals to cause a channel selection signal to be transmitted from the receiver to the transmitter via the wired communication channel;

means for acknowledging, at each receiver, receipt of a valid received data packet and a correct packet sequence number associated therewith; and means for synchronizing the initiation of playback of the multimedia data in each receiver according to the arrival time of a first received data packet having a zero-valued re-transmit number.

2. The apparatus of claim 1, wherein the clock rate of the decoder in the receiver is substantially the same as the clock rate of the encoder in the transmitter within +/−100 parts per million (ppm).

3. The apparatus of claim 1, wherein the receiver further comprises:

a reserve buffer configured for containing a first threshold number M of received data packets.

4. The apparatus of claim 3, wherein the first threshold number M is two (2) packets.

5. The apparatus of claim 1, wherein the receiver further comprises:

a power line interface;

a transceiver and controller section having a network transceiver and a microcontroller coupled between the power line interface and a decoder; and at least one decoder and two channel digital-to-analog (DAC) coupled in series from an output of the microcontroller for providing a baseband multimedia output signal.

6. The apparatus of claim 3, wherein the means for synchronizing comprises:

interrupt means responsive to entry of a packet into the reserve buffer in the receiver for initiating decoding of packets to be extracted from the reserve buffer when the reserve buffer is full; and extraction means for obtaining a data packet from the reserve buffer responsive to initiation of decoding.

7. The apparatus of claim 1, wherein the means for receiving comprises:

an infrared remote control receiver for receiving infra red signals from a user-operable, infra red remote control transmitter.

8. The apparatus of claim 1, wherein the means for receiving comprises:

an infra red remote control receiver for receiving signals from a user-operable keypad disposed on the receiver.

9. The apparatus of claim 1, further comprising:

means for acknowledging, at each receiver, receipt of a valid received data packet and a correct packet sequence number associated therewith; and means for synchronizing the rate of playback of the multimedia data in each receiver according to a measured time difference between an operating rate of the encoder and an operating rate of the decoder.

10. The apparatus of claim 9, wherein the clock rate of the decoder in the receiver is substantially the same as the clock rate of the encoder in the transmitter within +/−100 parts per million (ppm).

11. The apparatus of claim 9, wherein the receiver further comprises:

a reserve buffer in the receiver configured for containing a first threshold number M of received data packets.

12. The apparatus of claim 11, wherein the first threshold number M is two (2) packets.

13. The apparatus of claim 9, wherein the receiver further comprises:

a power line interface;

a transceiver and controller section having a network transceiver and a microcontroller coupled between the power line interface and a decoder; and at least one decoder and two channel digital-to-analog controller (DAC) coupled in series from an output of the microcontroller for providing a baseband multimedia output signal.

14. The apparatus of claim 9, wherein the means for synchronizing comprises:

first interrupt means responsive to arrival of a packet in the receiver for initiating a count up timer if playback has not already started;

second interrupt means responsive to entry of a packet into the reserve buffer in the receiver for initiating decoding of packets extracted from the reserve buffer when the reserve buffer is full; and comparison means for determining whether accumulated time in the timer, at the instant extraction for decoding begins, exceeds a predetermined second threshold value N.

15. The apparatus of claim 14, wherein the predetermined second threshold N is approximately 500 microseconds.

16. The apparatus of claim 14, wherein the comparison means further comprises:

means for issuing a command to skip the decoding of a sample if the accumulated value in the timer exceeds the predetermined threshold or issuing a command to repeat the decoding of a sample if the value in the timer is less than or equal to the predetermined threshold.

* * * * *